United States Patent
Woodell et al.

(10) Patent No.: US 7,868,811 B1
(45) Date of Patent: Jan. 11, 2011

(54) WEATHER RADAR SYSTEM AND METHOD USING DATA FROM A LIGHTNING SENSOR

(75) Inventors: Daniel L. Woodell, Cedar Rapids, IA (US); Kevin M. Kronfield, Cedar Rapids, IA (US); Karen L. Walling, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 61 days.

(21) Appl. No.: 12/177,767

(22) Filed: Jul. 22, 2008

Related U.S. Application Data

(63) Continuation-in-part of application No. 11/370,082, filed on Mar. 7, 2006, now Pat. No. 7,515,087.

(51) Int. Cl.
*G01S 13/95* (2006.01)
*G01W 1/02* (2006.01)
*G01S 13/00* (2006.01)
*G01W 1/00* (2006.01)

(52) U.S. Cl. .......... 342/26 B; 342/26 R; 342/175; 342/176; 342/182; 342/190; 342/191; 342/195; 702/1; 702/2; 702/3; 702/4; 73/170.16; 73/170.24

(58) Field of Classification Search ...... 342/26 R–26 D, 342/52–58, 175–182, 198, 450, 451, 460, 342/463–465, 190–197; 702/1–4; 324/72, 324/72.5; 73/170.16, 170.24
See application file for complete search history.

(56) References Cited

U.S. PATENT DOCUMENTS

| | | |
|---|---|---|
| 4,835,536 A | 5/1989 | Piesinger et al. |
| 4,914,444 A | 4/1990 | Pifer et al. |
| 5,036,334 A | 7/1991 | Henderson et al. |
| 5,049,886 A | 9/1991 | Seitz et al. |
| 5,077,558 A | 12/1991 | Kuntman |
| 5,198,819 A | 3/1993 | Susnjara |
| 5,291,208 A | 3/1994 | Young |
| 5,311,183 A | 5/1994 | Mathews et al. |
| 5,331,330 A | 7/1994 | Susnjara |
| 5,517,193 A | 5/1996 | Allison et al. |
| 5,521,603 A | 5/1996 | Young |
| 5,583,972 A * | 12/1996 | Miller ............... 342/26 D |
| 5,757,322 A * | 5/1998 | Ray et al. ............ 342/460 |

(Continued)

OTHER PUBLICATIONS

S. Goodman et al., "LISDAD Lightning Observations During the Feb. 22-23, 1998 Central Florida Tornado Outbreak"; posted on the Internet at noaa.gov; dated Jun. 1, 1998.*

(Continued)

*Primary Examiner*—Bernarr E Gregory
(74) *Attorney, Agent, or Firm*—Matthew J. Evans; Daniel M. Barbieri

(57) ABSTRACT

A weather radar system includes an input for receiving lightning detection data and processing electronics for determining a presence of a convective cell or associated hazard. The processing electronics receive weather radar data and the lightning detection data. The weather radar data is related to radar returns. The processing electronics provide temporal or spatial filtering of the lightning detection data to provide filtered data and determine a position of the convective cell or associated hazard in response to the weather radar data and the filtered data.

20 Claims, 12 Drawing Sheets

U.S. PATENT DOCUMENTS

| | | |
|---|---|---|
| 5,771,020 A | 6/1998 | Markson et al. |
| 5,945,926 A | 8/1999 | Ammar et al. |
| 6,201,494 B1 | 3/2001 | Kronfeld |
| 6,208,284 B1 | 3/2001 | Woodell et al. |
| 6,246,367 B1 | 6/2001 | Markson et al. |
| 6,388,607 B1 | 5/2002 | Woodell |
| 6,388,608 B1 | 5/2002 | Woodell et al. |
| 6,405,134 B1 | 6/2002 | Smith et al. |
| 6,424,288 B1 | 7/2002 | Woodell |
| 6,456,226 B1 | 9/2002 | Zheng et al. |
| 6,512,476 B1 | 1/2003 | Woodell |
| 6,549,161 B1 | 4/2003 | Woodell |
| 6,560,538 B2 | 5/2003 | Schwinn et al. |
| 6,577,947 B1 | 6/2003 | Kronfeld et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,690,317 B2 | 2/2004 | Szeto et al. |
| 6,741,203 B1 | 5/2004 | Woodell |
| 6,744,382 B1 | 6/2004 | Lapis et al. |
| 6,788,043 B2 | 9/2004 | Murphy et al. |
| 6,791,311 B2 | 9/2004 | Murphy et al. |
| 6,850,185 B1 | 2/2005 | Woodell |
| 6,879,280 B1 | 4/2005 | Bull et al. |
| 6,882,302 B1 | 4/2005 | Woodell et al. |
| 7,042,387 B2 | 5/2006 | Ridenour et al. |
| 7,082,382 B1 | 7/2006 | Rose, Jr. et al. |
| 7,200,491 B1 | 4/2007 | Rose, Jr. et al. |
| 7,307,583 B1 | 12/2007 | Woodell et al. |
| 7,383,131 B1 * | 6/2008 | Wey et al. ............... 702/4 |
| 7,515,087 B1 * | 4/2009 | Woodell et al. ........... 342/26 B |
| 2003/0016156 A1 | 1/2003 | Szeto et al. |
| 2005/0049789 A1 | 3/2005 | Kelly et al. |
| 2006/0036366 A1 | 2/2006 | Kelly et al. |

OTHER PUBLICATIONS

N. L. Wilson et al., "The Complementary Use of Titan-Derived Radar and Total Lightning Thunderstorm Cells"; proceedings of the 32nd Conference on Radar Meteorology; paper presented on Oct. 26, 2005; paper posted on the Internet at ou.edu.*

Hodanish, Stephen, "Integration of Lightning Detection Systems in a Modernized National Weather Service Office"; National Weather Service Office in Melbourne, Florida, pp. 1-5; viewed on Aug. 16, 2007, noaa.gov.

Pessi et al., "On the Relationship Between Lightning and Convective Rainfall Over the Central Pacific Ocean," Feb. 28, 2004, pp. 1-9.

"Meteorological/KSC/L71557/Lighting Detection and Ranging (LDAR)", no author given; Jan. 2002, pp. 1-12.

* cited by examiner

WEATHER RADAR SYSTEM AND METHOD USING DATA FROM A LIGHTNING SENSOR

CROSS-REFERENCE TO RELATED APPLICATIONS

This application is a continuation-in-part of U.S. patent application Ser. No. 11/370,085 filed on Mar. 7, 2006 now U.S. Pat. No. 7,515,087, which is herein incorporated by reference in its entirety.

COPYRIGHT NOTICE

A portion of the disclosure of this patent document contains material that is subject to copyright protection. The copyright owner has no objection to the facsimile reproduction by any one of the patent disclosure, as it appears in the Patent and Trademark Office patent files or records, but otherwise reserves all copyright rights whatsoever.

FIELD

The present application relates generally to the identification of hazards or potential hazards. More particularly, the present application relates to a method and a system for identifying convective and non-convective cells using a weather radar system.

BACKGROUND

Hazardous weather is generally associated with convective weather cells. Convective weather cells can produce turbulence, high winds, lightning, hail, and other weather hazards. With the large amount of air traffic and rising fuel costs, pilots are interested in identifying convective cells (e.g., often hazardous weather) from non-convective cells (e.g., stratiform rain) so they do not unnecessarily avoid flight routes through non-hazardous weather.

Lightning is generally caused by an updraft of induced charges. Generally, cells that are producing lightning are turbulent and have the capacity to produce hail. Therefore, the presence of lightning in a particular area can be an indication of the presence of a convective cell or at least a potentially hazardous weather region.

Weather radar systems generally include an antenna, a receiver/transmitter circuit, a processor, and display. The processor is coupled between the display and the receiver/transmitter circuit. The receiver/transmitter circuit is coupled between the processor and the antenna. The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft weather radar systems also include other hazard detection systems such as a turbulence detection system. The turbulence detection system can provide indications of the presence of turbulence or other hazards. Conventional weather radar systems include those manufactured by Rockwell Collins, Inc., Honeywell International, Inc. and others.

Some aircraft also utilize lightning sensors or lightning detection systems. Conventional lightning detection systems or lightning sensors include automatic direction finding (ADF-like) equipment at radio frequency (RF) or by narrow band optical imaging systems. Lightning sensors can include a display for showing the presence of lightning strikes with respect to the position of the aircraft.

Generally, lightning sensors have the ability to detect a rough spatial location of lightning strikes at a relatively significant range. However, conventional lightning sensors do not have the ability to locate and identify convective weather cells with relative accuracy and precision. Heretofore, lightning detection systems have not been effectively utilized with aircraft weather radar systems.

Both lightning sensors and weather radar systems have regions in their weather search range that are more accurate then other regions. Generally, lightning sensors have the ability to detect lightning strikes at long range, but cannot locate the distance to such lightning striking with a relatively high degree of accuracy. High performance weather radar systems can detect weather at substantial ranges but at some ranges have difficulty in determining whether or not an illuminated weather cell is hazardous.

Weather radar systems that utilize spectral width methods to determine turbulence hazards are generally used at ranges less then forty nautical miles because these methods are not as accurate at ranges greater then forty nautical miles. High performance weather radar systems can also utilize vertical reflectivity (e.g., cloud height) as an indicator of cell hazardousness. However, weather radar systems utilizing hazard detection methods based upon vertical reflectivity are limited in accuracy at longer ranges because the smaller antenna diameter of these systems prevents more accurate estimations of storm height.

In addition, certain weather phenomena (such as not convective or convective and dissipating weather cells that have substantial returns) are indicated as hazardous weather even though they are not necessarily hazardous. When the weather radar system indicates hazardous weather in response to this weather phenomena, the weather radar system unnecessarily provides hazard warnings and behaves more like a simple rain gauge than a hazard detector.

Lightning sensors can detect lightning at ranges far in excess of a weather radar system's ability to ascertain the level of a weather hazard. However, lightning sensors and lightning detection systems are generally not provided on aircraft because of their inherent range inaccuracy even though they provide accurate bearing estimations. Further, lightning detection by lightning sensors is generally only spatially correlated with hail and turbulence at scale lengths comparable to or greater than a typical size of a convective weather cell. Therefore, a lightning sensor is most accurate at pointing to the bearing of a cell that is producing lightning, and is less accurate at producing a range estimate to a hazard and identifying an aircraft sized path of safe passage.

Thunderstorm cores are difficult to identify using a conventional on-board weather radar system because weather frontal systems include many cells at different stages of development. Typically, a thunderstorm that has decayed still produces significant returns with a radar because the radar only detected water droplets, but water droplets do not necessarily pose a hazard to the aircraft. Within many thunderstorms, a new thunderstorm can develop that cannot be detected by the radar because it is growing within or adjacent to the decaying cell and is therefore obscured by the decaying cell. Growing or developing thunderstorm cells are generally hazards to aircraft because they include an updraft core that has turbulence, hail, and/or lightning associated with it. Convective cells can grow at rates between 1000 and 6000 ft/min.

Conventional radar systems may not operate quickly enough to immediately detect quickly growing cells.

Intracloud or cloud to cloud lightning can be a good indicator of growing thunderstorms and their core regions. Unfortunately, airborne lightning detectors provide poor location information on the lightning flash location. The azimuth error may be in excess of 5 degrees and the range error may be in excess of 20%.

Therefore, there is a need for a weather radar system that accurately combines an airborne radar with an airborne lightning detector and is capable of identifying where high rain rates are located (extent of thunderstorm) and where the thunderstorm cores producing aviation hazards are located. There is also a need for a weather radar system and method capable of predicting weather as an aircraft approaches the weather. There is further a need for a weather radar system and method capable of identifying and predicting soft spots, penetration points, or decaying regions within weather frontal lines to avoid long deviations around frontal lines. There is further still a need for a weather radar system and method capable of quickly detecting convective changes in cells.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One exemplary embodiment relates to a weather radar system including an input for receiving lightning detection data and processing electronics for determining a presence of a convective cell or associated hazard. The processing electronics receive weather radar data and the lightning detection data. The weather radar data is related to radar returns. The processing electronics provide temporal or spatial filtering of the lightning detection data to provide filtered data and determine a position of the convective cell or associated hazard in response to the weather radar data and the filtered data.

Another exemplary embodiment relates to a method of displaying an indication of a convective cell or associated hazard on an aircraft display in an avionics system. The method includes receiving lightning sensor data, filtering the lightning sensor data, receiving radar returns, and providing the indication of the convective cell or associated hazard on the aircraft display using the radar returns and the lightning data.

Another exemplary embodiment relates to an apparatus for determining a presence of a hazard for an aircraft. The apparatus includes means for determining a location of cells from weather radar returns, means for determining a presence of lightning, means for mapping the presence of lightning to a geographic area including an error factor, and means for displaying the convective cell or associated hazard on a display in response to the presence of lightning in the geographic area and the location of cells.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
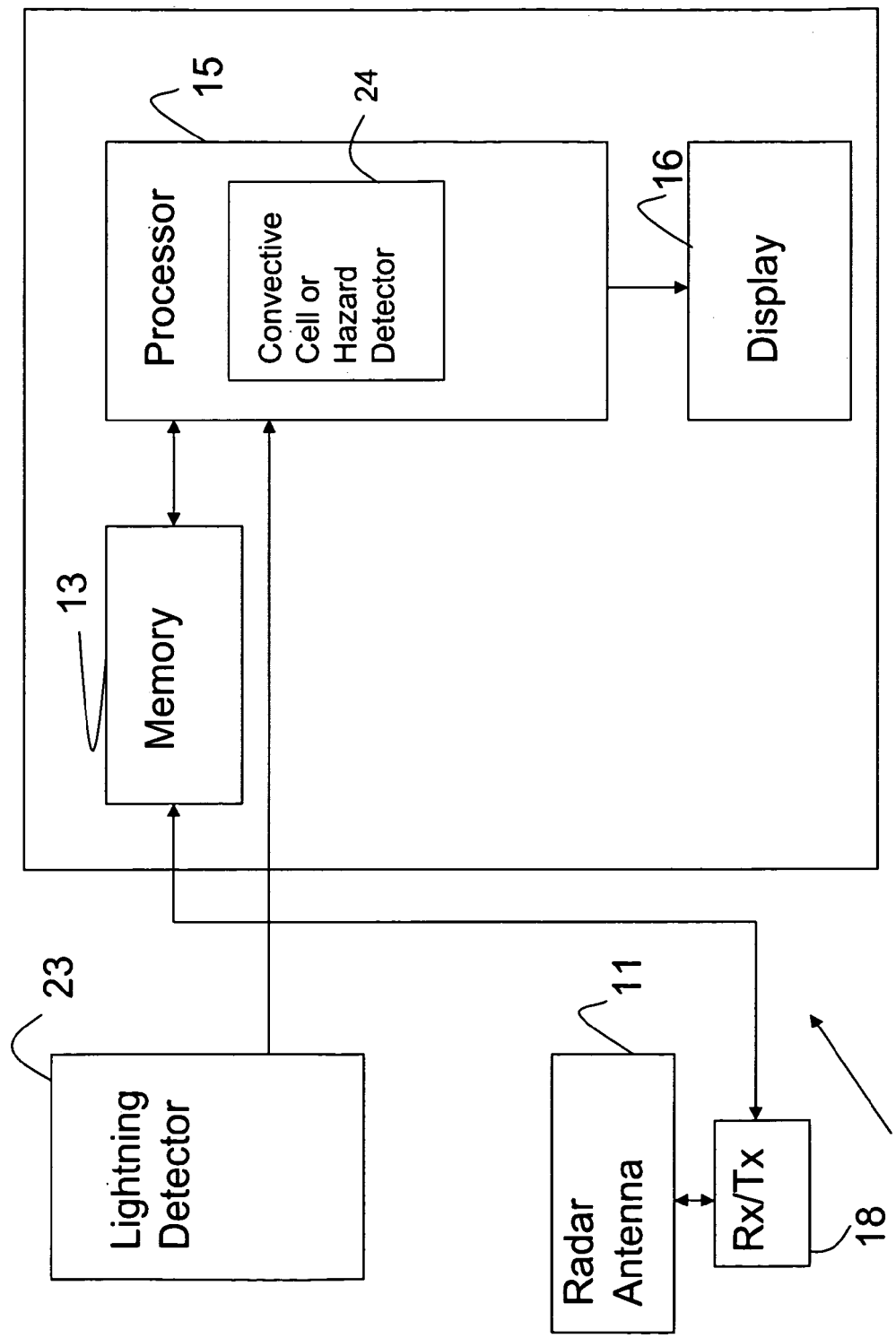
FIG. 1 is an exemplary general block diagram of a weather radar system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a weather radar system 10 which may be used on an aircraft is depicted. Weather radar system 10 can be similar to the system described in U.S. Pat. No. 6,388,608, the entirety of which is incorporated by reference or in U.S. patent application Ser. No. 11/153,972, the entirety of which is incorporated by reference. System 10 advantageously includes a hazard or convective cell detector 24 that is not available in conventional systems.

System 10 is advantageously configured to receive lightning sensor data. In one embodiment, system 10 is coupled to a lightning detector 23 as described below. Advantageously, convective cell detector 24 can provide convective cell information and/or hazard information, such as gust advisory information and lightning hazard information on a display 16 to improve pilot situational awareness, improve passenger safety, and decrease maintenance due to weather on aircraft.

Lightning detector 23 is an airborne lightning sensor that can provide an azimuth, time, duration, polarity, and frequency amplitude from the aircraft to the lightning flash. Detector 23 can derive a range interval from the frequency amplitude information. Applicants believe such combined information alone can be inadequate for determining an accurate position of the lightning flash or for determining the presence of convection.

Existing techniques for correlating lightning data use clustering techniques rely solely on the lightning data. Those techniques are inadequate for an airborne solution because airborne lightning sensors do not provide latitude and longitude of the lightning data. The hybrid approach of system 10 advantageously correlates radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Lightning detector 23 is a lightning sensor that can be integrated within system 10 or be a separate unit from system 10. Lightning detector 23 can be aboard the aircraft associated with system 10 or can be an onboard system communicating wirelessly with system 10. Detector 23 preferably provides lightning data indicative of the presence and/or location of lightning strikes. The lightning data can be raw data from detector 23 or processed data that indicates a location and presence for each lightning strike. In one embodiment, the lightning data points toward or indicates the bearing of detected lightning strikes.

System 10 advantageously uses weather radar ranging and cell identification in a multi-scan or volumetric radar system paired with a lightning detector's angle to a lightning strike to build a threat description on display 16. Applicants believe that using lightning data allows system 10 to identify and detect weather cells at ranges longer than a conventional radar is capable. Applicants believe that the identification of convective cells (and hazards associated therewith) with system 10 has superior ranging accuracy compared to a conventional lightning detector.

System 10 preferably includes a radar antenna 11, a processor 15, a memory 13, a display 16 and a receiver/transmitter circuit 18. System 10 is advantageously configured to include hazard detector 24. In a preferred embodiment, convective cell detector 24 is part of processor 15. Alternatively, convective cell detector 24 can be coupled to processor 15, to another part of system 10, or to other aircraft electronics. Detector 24 can be configured solely as a convective cell detector or as a hazard detector.

Convective cell detector 24 is shown in FIG. 1 as part of processor 15 and as receiving inputs from processor 15, lightning detector 23 or other components within system 10. However, detector 24 can receive parameters and data from various aircraft instrumentation to make a convective cell or hazard determination. Detector 24 can be operated in conjunction with the operations of processor 15 or separately from the operations of processor 15. Detector 24 can be embodied as its own software routine operating on its own platform or line replaceable unit. Similarly, lightning detector 23 can be embodied as its own software routine operating on its own platform or line replaceable unit or embodied as part of detector 24.

In a preferred embodiment, weather radar system 10 is a pulse Doppler radar system. System 10 preferably includes a weather radar return processing unit (e.g., processor 15) that can calculate standard deviations of wind velocities, a mean velocity parameter, a spectral width parameter, a range parameter, and reflectivity parameter to generate turbulence alerts, and to provide a display signal to display 16. In one embodiment, system 10 detects reflectivity by measuring the power of the returned signal. Velocity is measured by detecting changes in phase angle of returned pulses. Spectral width is measured by detection variation in change of phase angle of returned pulses.

Display 16 preferably provides color graphical images corresponding to the intensity of the radar returns. The graphical images can represent weather regions, rainfall densities, turbulence regions, etc. Convective cell detector 24 causes display 16 to provide visual indications of potential hazards and/or convective cells. In one embodiment, audio alerts are also provided.

System 10 can be a multi-scan radar system or similar system manufactured by Rockwell Collins, Inc. configured to include the features associated with convective cell detector 24 and lightning detector 23. According to certain embodiments, system 10 can be an RDR 4000 system or similar system manufactured by Honeywell International, Inc. configured to include the features associated with convective cell detector 24 and lightning detector 23. The type of weather radar system is not disclosed in a limiting fashion. The principles of the present application are applicable to any aircraft weather radar system in which sensing of potential and actual convective cells and/or hazards is performed or desired.

Advantageously, system 10 (e.g., convective cell detector 24) can determine the presence of a convective cell or hazard by utilizing data derived from weather radar returns received from circuit 18 and data derived from lightning detection data from lightning detector 23. Processor 15 and/or detector 24 can utilize the lightning detector data and the weather radar detector to determine the presence of a convective cell or weather hazard. For example, if lightning detector 23 indicates that lightning is occurring at a particular heading or a particular direction from the aircraft and the weather radar data indicates that a cell is located in that direction, processor 15 and convective cell detector 24 can mark that cell on display 16 as being a convective cell because lightning indicates the presence of a conductive cell which may contain hail, lightning or high turbulence. In this way, a weather radar system is complemented by the use of data from lightning detector 23.

Weather radar system 10 advantageously uses lightning detector data and weather radar returns to identify and locate hazards as a hybrid system. Three exemplary algorithms for identifying convective cells are discussed below with reference to FIGS. 8-10.

Hazard and convective cell indications can be provided on display 16 in a number of fashions. In one exemplary embodiment, cells that are evaluated as potential lightning hazards can be identified by an icon that encompasses the entire weather cell or an individual threat icon. Alternatively, an individual threat icon (e.g., a lightning bolt) can be embedded at the cell center. Further, a color or colored border can be utilized to identify the cell with the potential lightning hazard. In another embodiment, the icon can fade or change color as the period of time (after which the triggering thresholds are no longer met) expires. In addition, hazards can be identified on display 16 as a cell labeled with the letter "C" or a color border to indicate a convective cell.

The details about system 10 are provided in an exemplary fashion. The principles of the present application are applicable to any weather radar system utilizing radar data for a display. The various components and circuits described below can be implemented in almost any hardware or software configuration depending upon design parameters and system criteria.

In a preferred embodiment, processor 15 and circuit 24 are implemented in software subroutines. The subroutines can be executed on one or more digital signal processors associated with system 10. In one embodiment, system 10 uses a hardware platform of a WXR-2100 weather radar system manufactured by Rockwell Collins, Inc. or an RDR 4000 weather radar system manufactured by Honeywell International, Inc. However, the present application is not limited to any type of hardware platform.

Lightning detector 23 is preferably a Storm Scope™ ADF lightning sensor, narrow band optical imaging system, or other sensor for determining the presence of lightning strikes. Detector 23 preferably also provides a bearing to lightning strikes and an estimated location of lightning strikes. In one example, the lightning detector can be an LD-250 lightning detector configured for communication with detector 24.

In one embodiment, detector 23 provides the data in range and azimuth form to processor 15 indicating the location and presence of lightning strikes or at least the bearing from the aircraft to the lightning strike. Alternatively, processor 15 can obtain raw data from lightning detector 23 and determine presence and location of lightning strikes from the raw data.

Detector 23 can be a detector purchased from Boltek Company or L3 Communications Company and modified to be used with system 10. Alternatively, detector 23 can be a ground based detector system and lightning data can be provided by transmission to the aircraft. In one embodiment, detector 23 is simplified by only providing angle to lightning strike information as discussed with reference to FIG. 3 so that detector 23 can become a simpler and less expensive wideband ADF design.

An antenna for detector 23 can be located at a base of a pedestal boom and utilize the pedestal power associated with weather radar system 10 and its interface to the remote radar transceiver circuit 18. In addition, the antenna for detector 23 can use the current weather radar mechanical pedestal structure associated with antenna 11.

Advantageously, system 10 can be configured for self-calibration. Convective cells can be correlated with lightning tracks to determine a direction dependent azimuth bias. The bias can be identified over time by comparing the azimuth difference from the detections from detector 23 and detector 24. Once the azimuth bias is known, it can be removed to calibrate the azimuth response of detector 23 (e.g., by adding or subtracting the bias). That bias may vary over the azimuth range of detector 23 or with movement of antenna 11. Data can be collected to determine the azimuth bias on a per range and/or movement of antenna 11 basis. The calculation of bias and correction of bias can be performed by detector 24.

Figure 2:
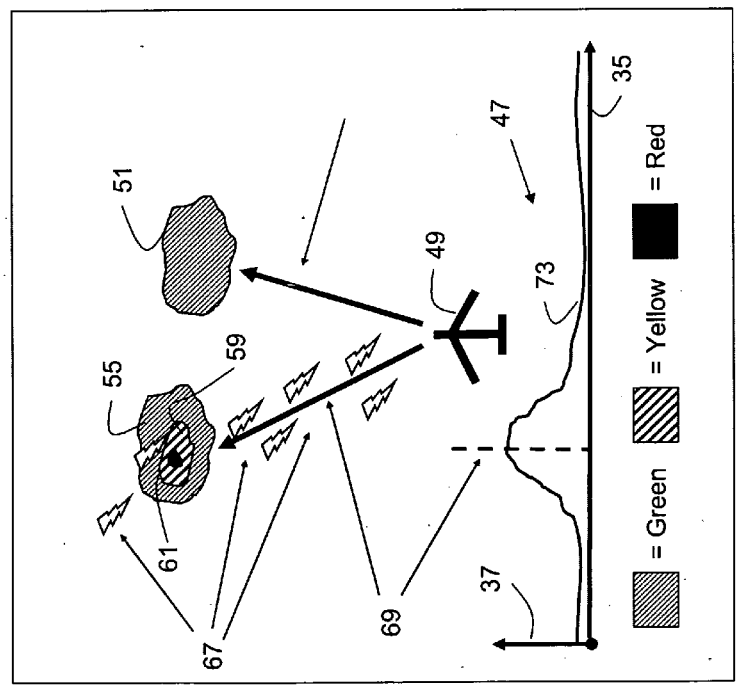
FIG. 2 is a schematic illustration of an aircraft flying in a space containing weather including lightning and weather that does not include lightning.

With reference to FIGS. 1 and 2, processor 15 of system 10 provides signals, either directly to receiver/transmitter circuit 18 or indirectly through memory 13, to provide radar beams at radar antenna 11. Preferably, processor 15 is configured to operate system 10 as a pulse Doppler multi-scan, multi-tilt angle radar system or a volumetric radar system in which radar beams are produced at more than one tilt angle. Processor 15 receives radar returns through receiver/transmitter circuit 18.

Processor 15 can receive the radar returns (or signals/data related thereto) directly or through memory 13. Similarly, processor 15 can receive the lightning data either directly or through memory 13. Receiver/transmitter circuit 18 can be a single path or can have separate circuits for a receive path and a transmit path. Processor 15 can determine a reflectivity parameter, a mean velocity parameter and/or a spectral width parameter for use by detector 24.

Figure 5:
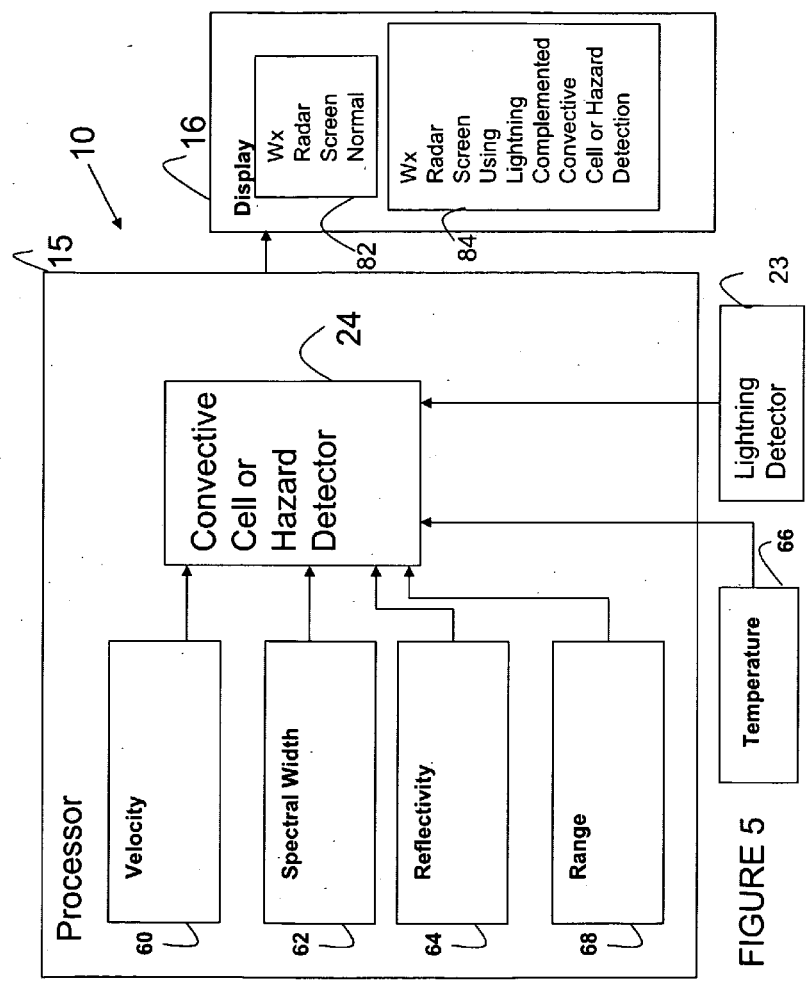
FIG. 5 is a more detailed exemplary general block diagram of a processor for the weather radar system illustrated in FIG. 1 in accordance with another exemplary embodiment.

In FIG. 2, processor 15 identifies weather systems 51 and 55 and provides a display of weather systems 51 and 55 for aircraft 49 on display 16. Systems 51 and 55 can be marked without lightning bolts 67 and 69 on a normal weather radar screen 82 (FIG. 5). Indications of lightning bolts 67 can be provided on a weather radar screen using a weather radar screen 84 (FIG. 5) that uses lightning complemented convective cell and/or hazard detection. Weather systems 51 and 55 are denoted using the standard green, yellow and red colors for severity of weather.

Detector 24 preferably utilizes information from lightning detector 23 to identify and locate lightning bolts 67 on display 16. As shown on graph 47 (FIG. 2), a line 73 indicates a flash density on a Y axis 37 and an azimuth angle on an X axis 35. A maximum at dashed line 69 indicates a pointing angle to the highest flash density of lightning. Applicants believe that a reasonable pointing angle utilizing a conventional lightning detector is still provided even though relatively weak/ranging data can be associated with lightning bolts 67.

Utilizing the lightning data, hazard detector 24 can identify cell or system 55 as including more hazardous weather and cell 59 as not including as hazardous weather because of the limited or lack of lightning. Accordingly, a pilot can advantageously find a flight path through weather system 51 which may have been avoided as hazardous weather without the advantageous use of lightning data.

Flash rate history may be used to determine cell maturity. Increasing flash rates verses time indicate a cell in a growth stage while decreasing flash rates verses time indicate a cell that is decaying. High continuing flash rates indicate possible mature super-cell convection.

The determination of cell maturity allows cells that are in the dissipating stages to be identified as potential flight paths when needed by an aircraft after some delay to allow decaying non-flashing cells to discharge. Flash rate history can be stored in memory 13.

Figure 4:
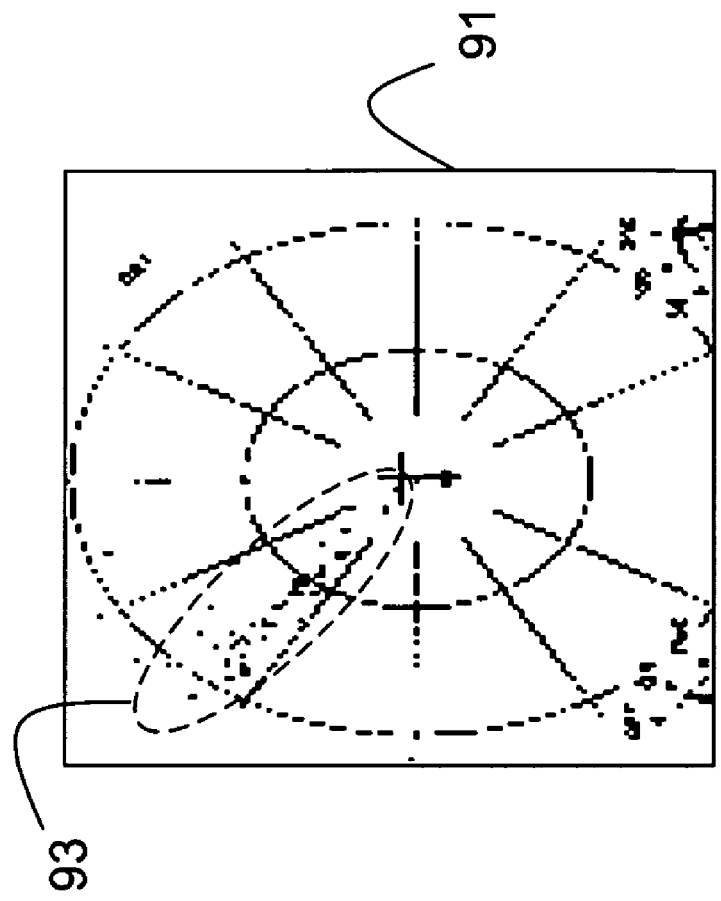
FIG. 4 is a screen shot of a lightning sensor display.
Figure 3:
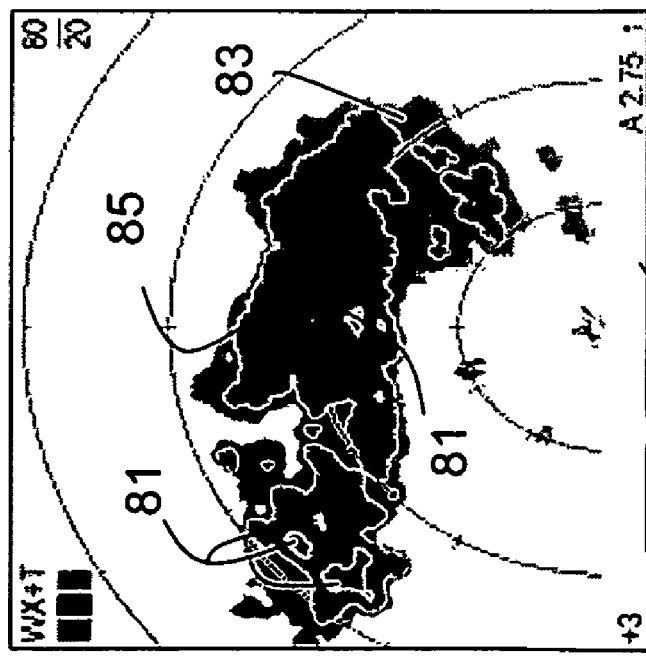
FIG. 3 is a screen shot of a weather radar display.

With reference to FIG. 3, a screen 81 (a normal weather radar screen 82 in FIG. 5) shows weather including red regions 81, green regions 83, and yellow regions 85. With reference to FIG. 4, a screen 91 for a lightning detector shows the presence and location of lightning strikes encircled by oval 93. System 10 advantageously uses the data associated with screen 81 and screen 91 to identify convective cell and/or hazardous regions on a weather radar screen 84 (FIG. 2) that uses lightning complemented convective cell and/or hazard detection.

With reference to FIG. 5, convective cell detector 24 can receive various data inputs. Convective cell detector 24 can receive inputs derived from one or more of the following: velocity parameter, a spectral width parameter 62, a reflectivity parameter 64, and/or a range parameter 68. Processor 15 can generate parameters 60, 62, 64 and 68 based upon weather radar return data. Convective cell detector 24 can also receive temperature data 66 and data from lightning detector 23.

Convective cell detector 24 can process at least one of parameters 60, 62, 64, 66, 68 and data from detector 23 to provide a display screen 84 including hazard detection. In addition, convective cell detector 24 can cause system 10 to perform further analysis in light of information from lightning detector 23 or parameter 60, 62, 64, 58 and 66. The further analysis can even include causing system 10 to perform weather radar queuing as well as examining new data or historical data.

Threat descriptions on display 16 can include lightning, hail, and turbulence. All three hazards can have substantial impact on airline operations and may be blended with a weather radar's solo threat assessments at shorter ranges. In one embodiment, the display of turbulence and potential lightning may be paired with entire cells and circled by a line of the normal turbulence color at lower levels of hazard. Regions of likely lightning and directly measured turbulence may use either a solid second level turbulence color or be encoded with an icon. Display 16 should allow slewing from the full cell identification of convective weather at long ranges to a shorter range sub-cell size regions of likely hazard.

Figure 6:
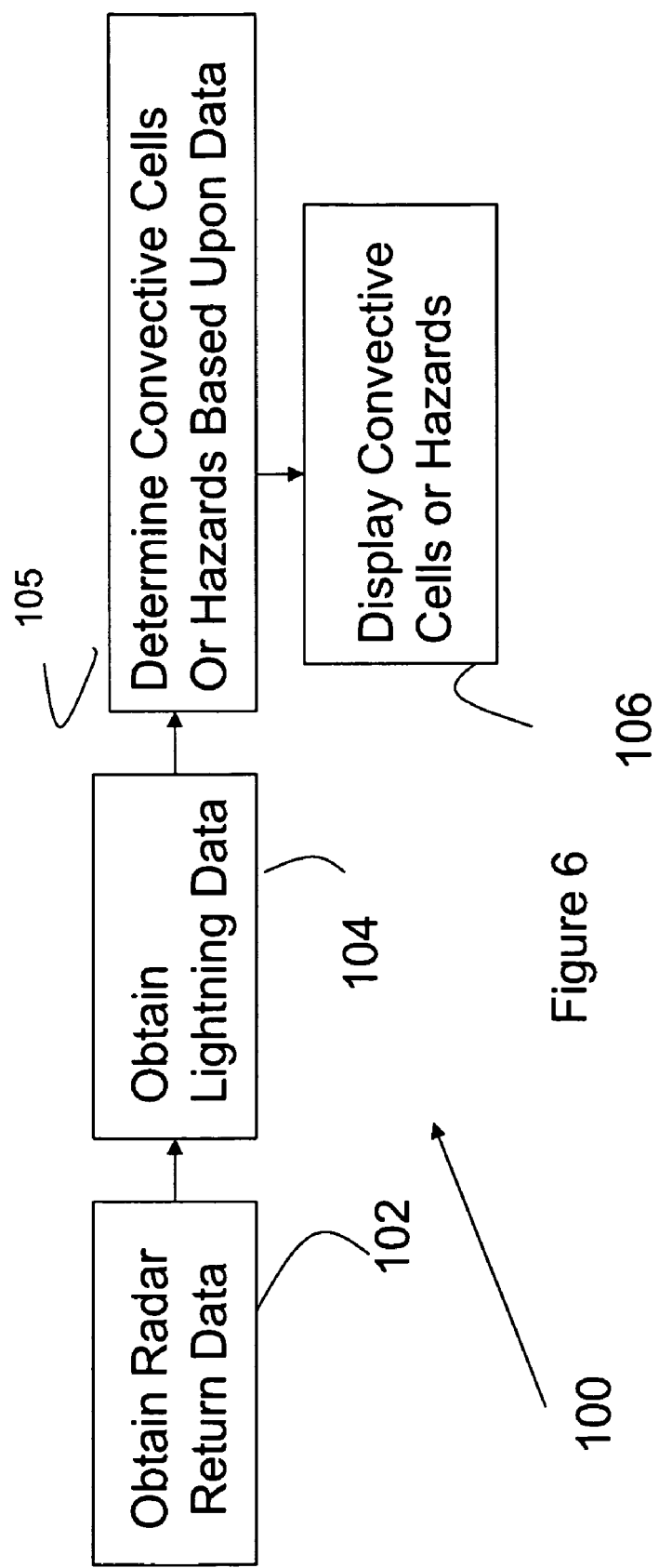
FIG. 6 is a flow diagram showing operation of the weather radar system illustrated in FIG. 1 in accordance with another exemplary embodiment.

With reference to FIG. 6, a flow chart 100 shows exemplary of operation of system 10. System 10 obtains radar return data at a step 102 and obtains lightning data at a step 104. Utilizing both radar return data and lightning data, system 10 determines the presence of hazards based upon the data. Once system 10 determines convective cells and/or hazards based upon the data obtained from steps 102 and 104, the convective cells and associated hazards can be displayed at a step 106. System 10 preferably filters the lightning data spatially and/or temporally at step 104.

System 10 can utilize a variety of algorithms preferably implemented in software. In one embodiment, temporal and/or spatial filtering is achieved by a correlation algorithm that is utilized in detector 24 to correlate lightning data and reflectivity data.

In order to correlate lightning and reflectivity data, detector 24 minimally receives a lightning flash azimuth data from detector 23 and then performs spatial and temporal correlation of the lightning flash data and airborne radar reflectivity data from processor 15 in the following exemplary manner:

Spatial Correlation:

1. A geo-referenced line segment is generated using the sensor position, azimuth, and maximum range of detector 23. The geo-referenced line segment is stored in memory 13. If a range interval is provided for the lightning flash, the geo-referenced line segment end-points may be bounded by that range interval. Alternatively, two geo-referenced line segments may be calculated, bounding the azimuth uncertainty of the lightning flash.

2. Detector 24 segments the current detected reflectivity regions (weather objects) into disjoint reflectivity regions. Those disjoint reflectivity regions represent unique weather events and will be stored as geo-referenced shape descriptors (i.e. points, polygon, ellipse, etc.). Identifying disjoint weather events is valuable because it represents the aggregate contours of the reflectivity region and is a better representation of the total area of the weather event, as detected by system 10.

3. The lightning line segment and disjoint reflectivity regions are mapped to geo-referenced memory. If the lightning line segment intersects a reflectivity region shape descriptor, then the lightning flash is associated with that lightning line segment, and therefore correlated with the weather event associated with the reflectivity shape descriptor. The lightning flash and weather event are now successfully correlated, so the weather event has at least one lightning flash associated with it.

4. If the line segment intersects more than one disjoint reflectivity region, then detector 24 may use one or more techniques such as Set Theory, Fuzzy, or probabilistic logic to determine to which disjoint reflectivity region, the lightning flash belongs. As an example, a set theory approach would define each disjoint reflectivity region as a unique "set" and lightning flashes would be an element correlated with each set based upon the axioms and rules that define varying degrees of membership. For example, a lightning flash line segment that intersects or bisects two sets (disjoint reflectivity regions) would violate an axiom where lightning flash elements can only belong to one set. Rules are used to determine which of the two reflectivity sets the element belongs. For example, an exemplary rule states for each bisected set, the proximity of the bisecting line to the bisected set's centroid may be compared to determine the set that is bisected closest to the centroid. The set that is bisected closest to the centroid is the correlated set and the set that the element belongs. Additional rules including uncertainty may also be modeled as part of the rules for membership.

5. If a lightning flash does not intersect or bisect a reflectivity region, then the lightning flash is correlated with the nearest reflectivity within 10 miles of the lightning flash. Otherwise, the lightning flash is probably from a weather event that is not currently being detected by system 10.

6. Previous steps are repeated as new reflectivity and lightning flash data are received.

Temporal Correlation:

7. Storing the reflectivity and lightning data is necessary for convective assessment and tracking reflectivity and lightning regions is useful for growth and decay assessment of the convective region. New geo-referenced disjoint reflectivity shape descriptors are generated as new data is received from the radar.

8. The new reflectivity shape descriptors are correlated with previously stored reflectivity shape descriptors so that weather events can be tracked over time.

9. New lightning flash data is correlated with the new reflectivity shape descriptors. Since the previously correlated lightning and reflectivity data is correlated with the new data through the reflectivity tracking, detector 24 can determine the cumulative number of lightning strikes (total lightning strikes) associated with a weather event over time.

10. As new lighting flash data is correlated with new and previous reflectivity, the lightning flash data associated with each disjoint reflectivity region may be aggregated to form a unique lightning region or shape descriptor associated with the weather event. For example, if eight lightning flashes were correlated with a weather event over the last minute, the position and area uncertainty of each lightning flash is modeled and may be mapped to geo-referenced memory. A shape descriptor may be generated representing the aggregate lightning region associated with that weather event. That information is useful for convective assessment of the weather event as well as weather event tracking.

11. Previous steps are repeated as new reflectivity and lightning flash data is received.

The above description of the spatial correlation and temporal correlation algorithm is for example only. Both spatial and temporal correlation do not have to be performed. Various other algorithms can be utilized to interpret lightning data and reflectivity data. Once spatial and temporal correlation is achieved, detector 23 can analyze the correlated data to identify convective and/or hazard regions.

Figure 7:
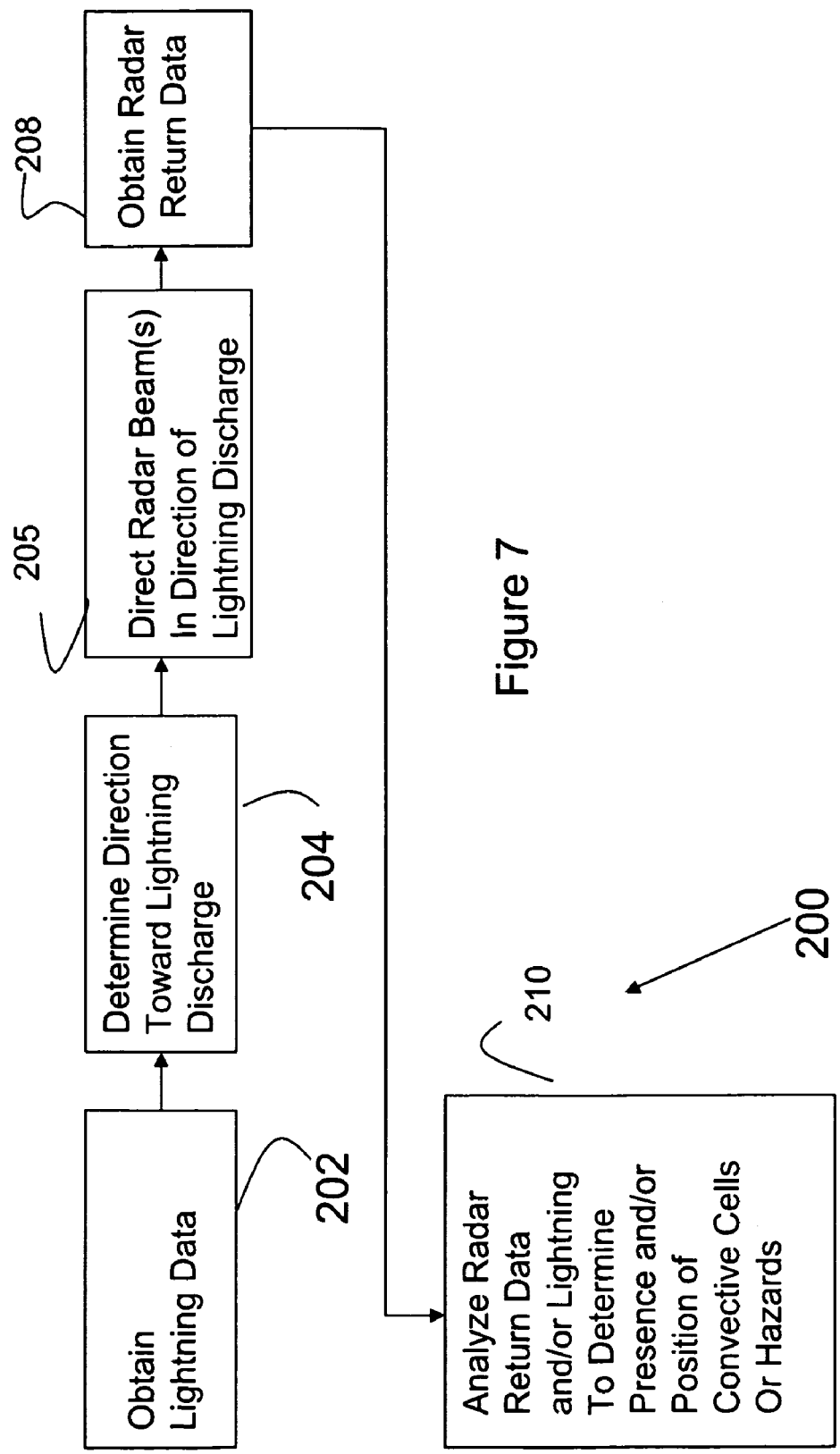
FIG. 7 is another flow diagram showing operation of the weather radar system illustrated in FIG. 1 in accordance with still another exemplary embodiment.

With reference with FIG. 7, a flow chart 200 shows another exemplary operation of system 10. At a step 202, lightning data is obtained. At a step 204, a direction associated with lightning discharges determine from the lightning data is determined.

At step 205, radar queuing is performed. Radar queuing allows system 10 to provide radar beams and obtain radar returns from a particular area associated with the lightning discharge. For example, system 10 can identify a region based upon the lightning data and add several dB and loop gain to provide further analysis of the region associated with the lightning. Further, system 10 may dwell longer in limited regions of space for higher loop gain. Such radar queuing allows system 10 to detect new thunder storms growing under the radar sample volume.

According to one embodiment, a scan strategy can be developed to maximize convective cell identification and detection. When lightning detector 24 produces an azimuth with a reasonable chance of a cell being alone, the radar scan can be both focused in time and changed in properties to maximize cell detection along that line. Vertical scans may be used alone the line detection to best detect early convection or cells below the current normal radar scan altitude. For short range detection, such as detection of a cell below the current scanning system that is growing, system 10 can use freezing point (temperature detection) to assist. Freezing point is an initial growth point for most convective cells so starting there at short ranges is a reasonable scan strategy. (This case assumes a lightning track before detection by radar returns.)

In addition, radar queuing allows Low Probability of Intercept (LPI) operations since only limited azimuth angles need to be scanned. In this way, system 10 advantageously samples azimuth regions that are likely to have convective activity while limiting radar pulses that may allow an adversary to produce a bearing on the aircraft carrying the LPI radar. Radar queuing allows system 10 to use its available sample time more efficiently, allowing detections at both longer ranges and at lower radar reflectivity levels.

Preferably, analysis using the weather radar with lightning return data is performed at a step 208. The analysis can allow weather cells to be characterized as convective versus non-convective cells. Cells that are significant convective cells will have associated flash rates greater than 3 flashes per 10 minute interval (see Hallowell et al. (1999))

In addition, convective regions can be identified for Intertropical Convergence Zone (ITCZ) penetration. Since ITCZ weather returns have a different characteristic from other weather environments (such as Continental United States (CONUS)), the association and hazard logic may be different (See *On the Relationship Between Lightning and Convective Rainfall over the Central Pacific Ocean*, Pessi et al. 2004). Penetrations should be made in regions where flash rates are at a minimum. Since cell maturity is somewhat related to flash rate, regions with non-existent or decaying flash rates may be targeted as possible penetration points. Further, cell characterization allows identification of false weather returns caused by anomalous propagation and discrimination of tropical weather from convective cells. Further, analysis of the weather radar return data based upon radar queuing and use of lightning data allows characterization of convective cell maturity and inferences of hail to be determined.

Figure 8:
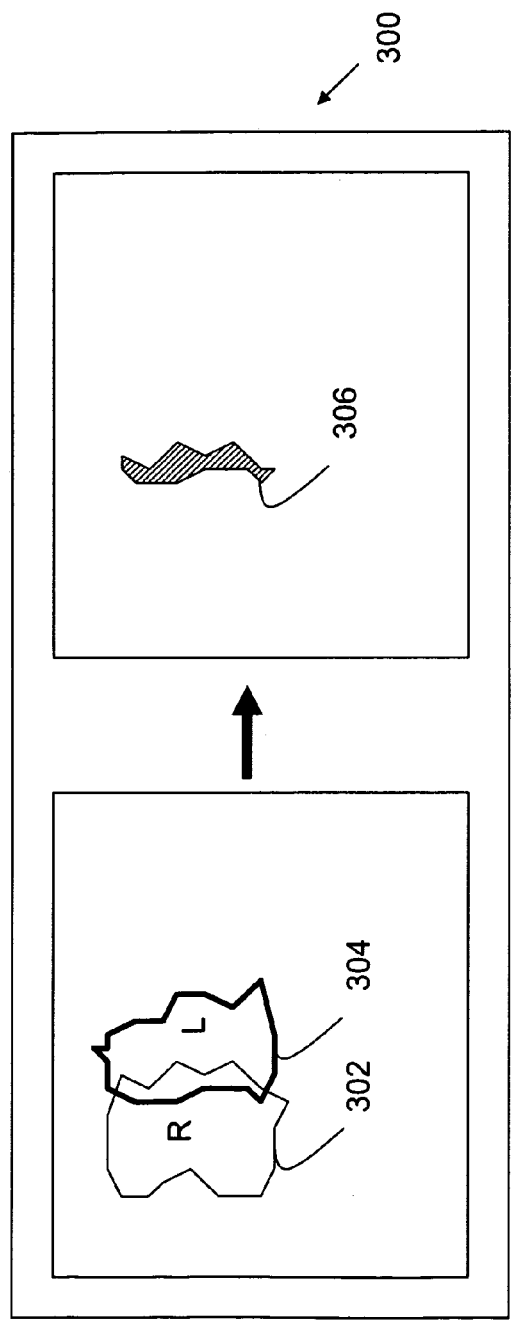
FIG. 8 is a general block diagram showing a cross-correlation algorithm for determining the location of a convective cell for use in the system illustrated in FIG. 1 in accordance with yet still another exemplary embodiment.
Figure 9:
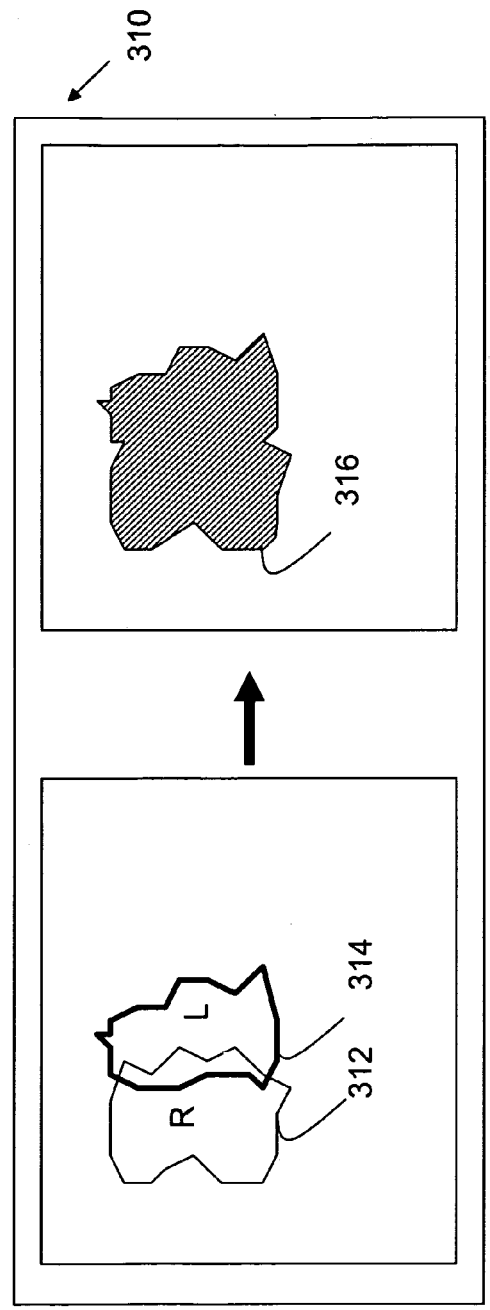
FIG. 9 is a general block diagram showing a combination algorithm for determining the location of a convective cell to use in the system illustrated in FIG. 1 in accordance with yet still another exemplary embodiment.
Figure 10:
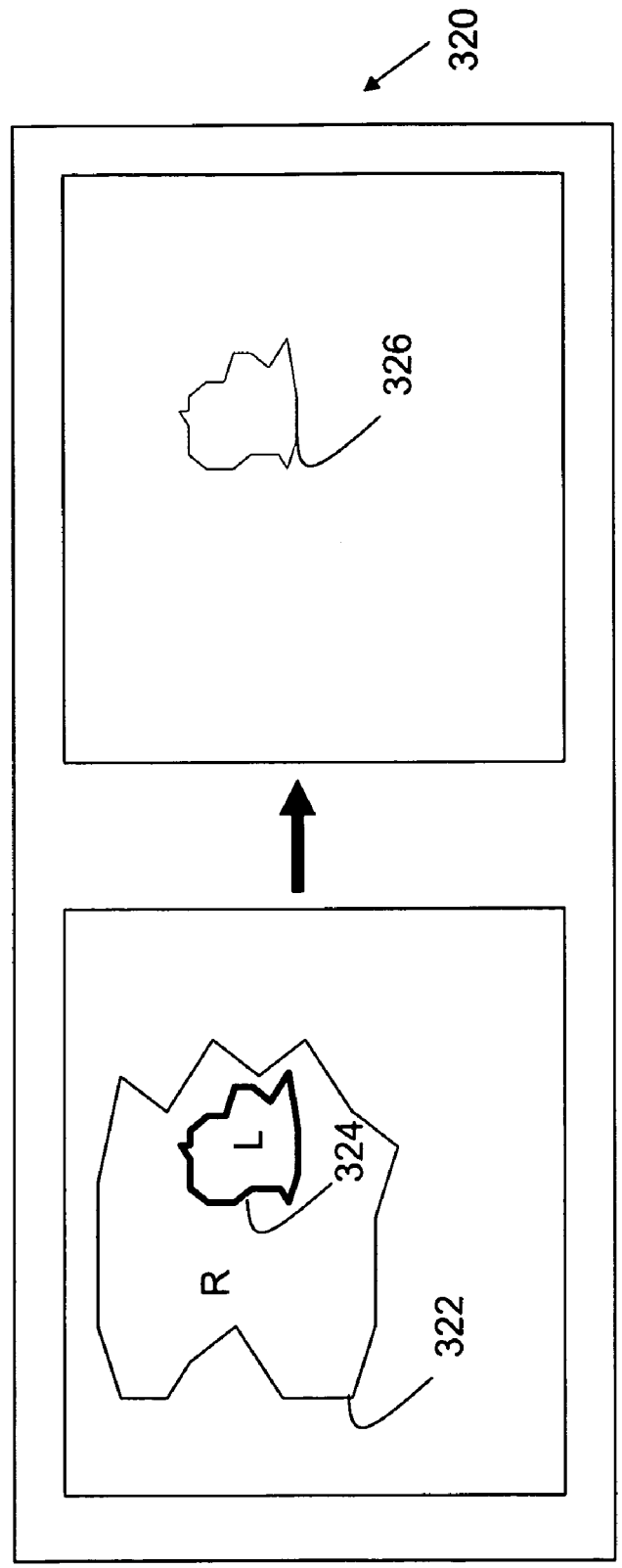
FIG. 10 is a general block diagram showing a union algorithm for determining the location of a convective cell for use in the system illustrated in FIG. 1 in accordance with yet still another exemplary embodiment.

With reference to FIGS. 8-10, system 10 can implement an algorithm to perform various types of detection identification schemes. For example in FIG. 8, a cross-correlation detection scheme is represented in a diagram 300. A region 302 is detected from weather radar returns and a region 304 is detected from a lightning detector. Regions 302 and 304 are correlated in time and space. A region 306 is shown as a convective cell region or hazard region because it is a region common to both regions 302 and 304.

With reference to FIG. 9, an additive detection scheme is represented in a diagram 310. A region 312 associated with detection by weather radar returns and a region 314 associated with detection by lightning data is utilized to provide a region 316 associated with convective cells. Region 316 contains regions that are in either region 312 or 314.

With reference to FIG. 10, a drawing shows a subset detection scheme. Region 322 is the region determined by weather radar returns and region 324 is the region determined from lightning data. Region 324 is entirely within region 322. A region 326 representing region 324 which is within region 322 is shown as a convective cell or hazard region.

In alternative embodiments, the additive, cross qualify, and subset algorithms can be adjusted to take into account various factors including geographic locations, ranges of radar returns and lightning data, temperatures, etc. For example, radar returns tend to be more accurate at shorter ranges and accordingly greater weight may be given to regions detected by weather radar at shorter ranges. Longer range detection may be more accurate for lightning sensors. Accordingly, longer range detection may be given more weight when done by lightning detector 23.

Figure 11:
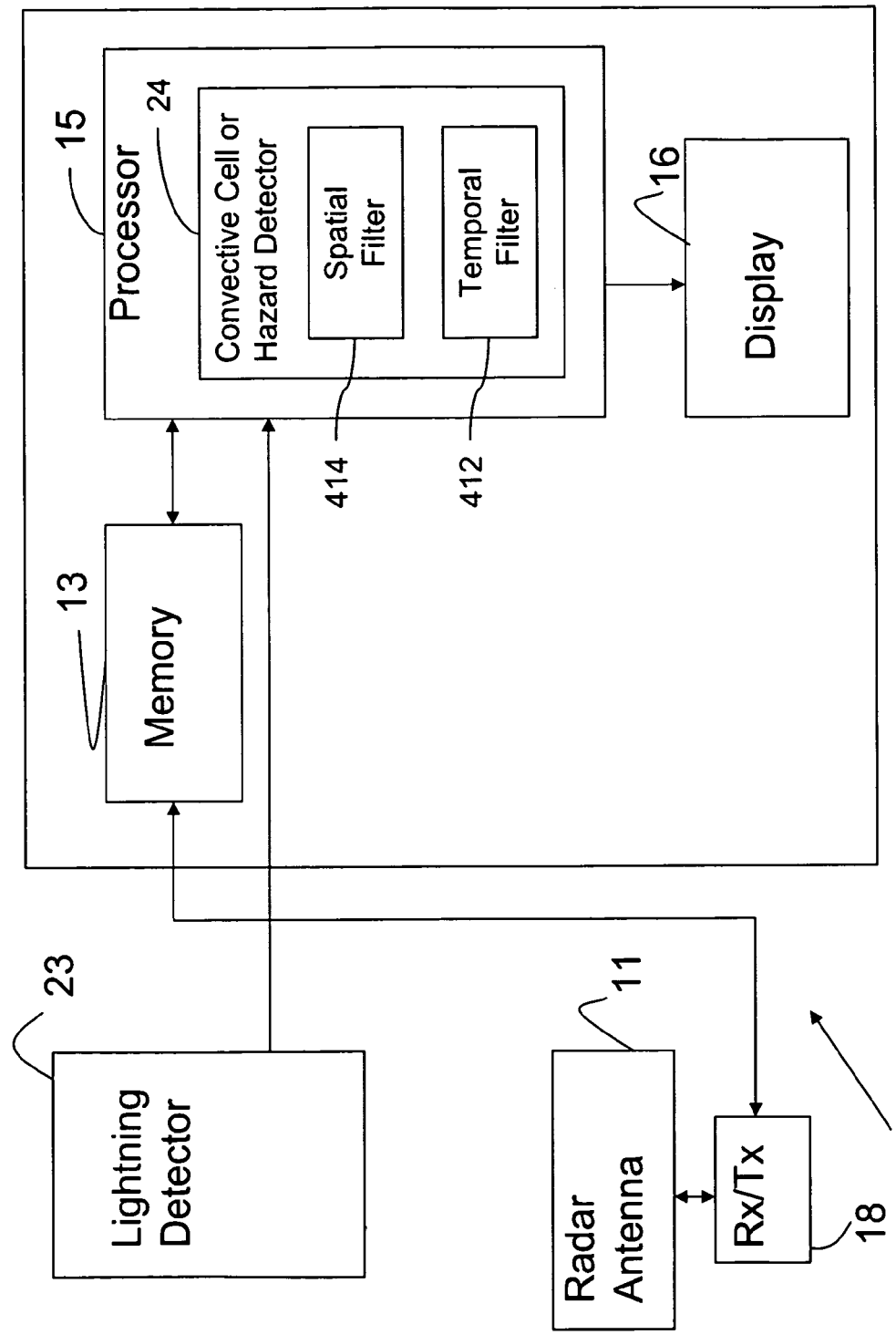
FIG. 11 is an exemplary general block diagram of a weather radar system including spatial and temporal filtering in accordance with an exemplary embodiment.

FIG. 11 is an exemplary general block diagram of a weather radar system 410 that is similar to weather radar system 10. Weather radar system 410 functions in substantially the same way as weather radar system 10, but convective cell or hazard detector 24 includes a temporal filter 412 and a spatial filter 414 in accordance with an exemplary embodiment. Temporal filter 412 and spatial filter 414 are generally configured to filter lightning data received from lightning detector 23 for display on display 16.

By using temporal filter 412 and spatial filter 414 on the lightning data received from lightning detector 23, weather radar system 10 preferably identifies the core locations or most active regions of lightning, which indicate thunderstorm core locations. Temporal filter 412 processes lightning data over a predetermined time period (e.g., about thirty seconds, about one minute, about two minutes, about five minutes, about ten minutes, etc.) and maps the area to an estimated geographic location as determined by lightning sensor 23. Spatial filter 414 may also filter out lightning strikes based on the frequency in a particular geographic region. For example, lightning may only be used at geographic positions with the top 10%, the top 25%, the top 50%, etc. of observed lightning strike rates. In other examples, lightning may only be used at geographic locations where at least 5 flashes, 10 flashes, at least 20 flashes, etc. have occurred. The estimated geographic location generally includes range and azimuth data from sensor 23. Using the expected error associated with the range and azimuth location, a lightning map can be created to show the geographic area covered by the lightning flash (including the error).

The lightning flash error may cause multiple pixels (where each pixel has a predetermined size) to map to a single detected flash. If over the sample period another flash maps to the same pixel location, then a summation function may be applied to add another flash to the pixel value. Therefore, the map may include pixels with various corresponding flash values or lightning strike frequencies/rates. The pixels with the largest flash values may correspond to the thunderstorm cores, because thunderstorm cores produce the majority of the lightning flashes associated with a thunderstorm.

The core locations can be combined/filtered with the airborne radar data to improve the identification of the location (including range and azimuth) of the thunderstorm and/or thunderstorm cores within a detected radar signature. Spatial filter 414 is configured to filter the lightning data from lightning detector 23 with respect to the position of the lightning strike and radar data. Spatial filter 414 may filter out lightning data that does not correspond to a similar position as radar data of a predetermined reflectivity (e.g., greater than about 0 dBZ, greater than or equal to about 10 dBZ, greater than or equal to about 20 dBZ, greater than or equal to about 30 dBZ, greater than or equal to about 40 dBZ, etc.) or spectral width. The spatially and temporally filtered lightning data may then be overlayed or combined with the radar data on display 16 or stored in memory 13 for later use.

Figure 12:
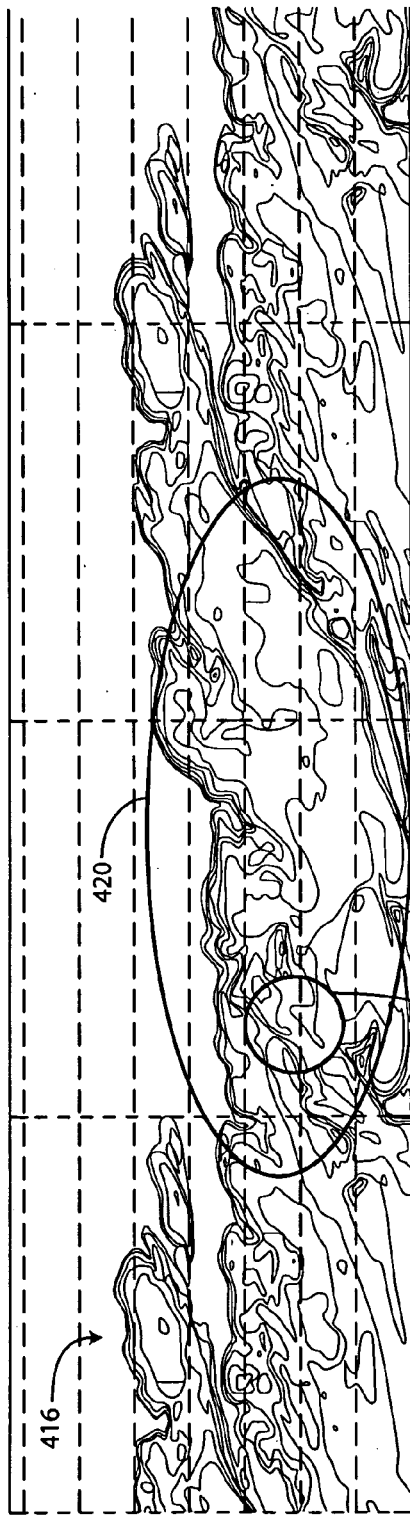
FIG. 12 is a side sectional view of a cell according to an exemplary embodiment.

FIG. 12 is a side sectional view or vertical slice of radar data of a cell 416 according to an exemplary embodiment. Weather radar system 410 can detect whether a cell is growing or decaying in activity (e.g., turbulence, lightning activity, hail, moisture absorption, etc.). For example, a cell core 418 may be growing within a cell 420 that is generally decaying. Cell core 418 may be the main updraft region or most active region of cell 420 and may absorb the most moisture from the ground.

Figure 13A:
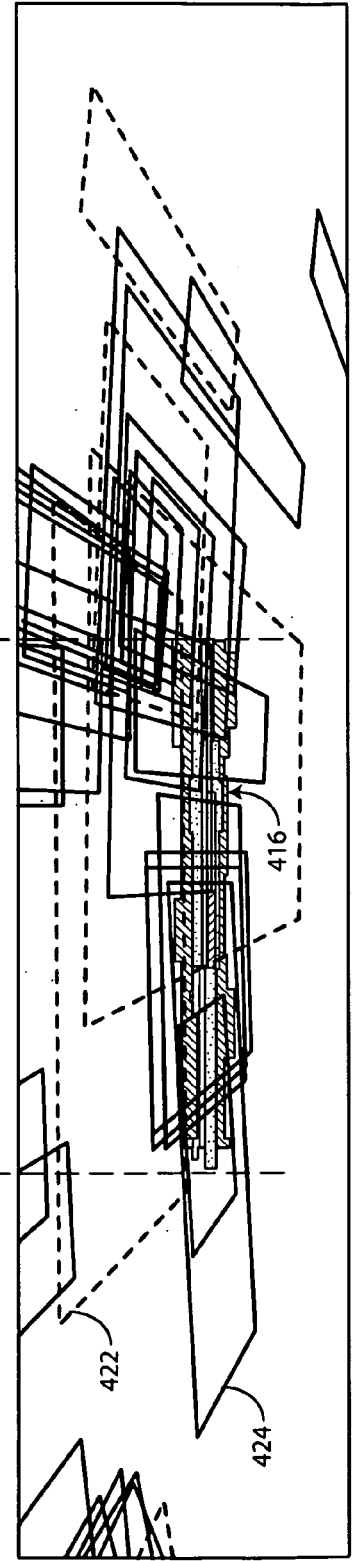
FIG. 13A is a top view of the cell of FIG. 12 including representations of lightning strikes according to an exemplary embodiment.
Figure 13B:
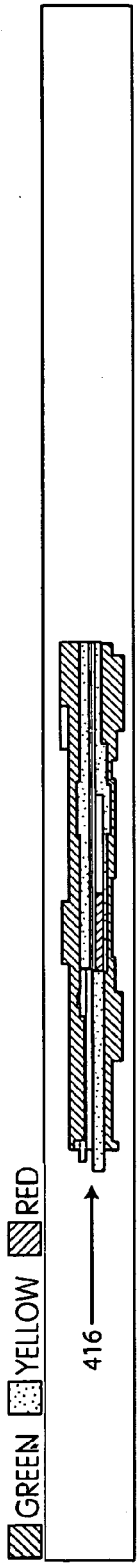
FIG. 13B is a top view of the cell of FIG. 13A omitting the representations of lightning strikes according to an exemplary embodiment.

FIG. 13A is a top view of cell 416 including representations of lightning strikes according to an exemplary embodiment. An overhead radar reflectivity image of the cell shown in FIG. 12 as indicated by the dashed lines extending between the two FIGURES. FIG. 13B is a more detail top view of the radar returns of cell 416 with the representation of lightning strikes removed.

Lightning detector 23 may detect both cloud to ground lightning 422 (represented by dashed line polygons) and cloud to cloud lightning 424 (represented by solid line polygons). The polygons represent lightning flash locations including associated range and azimuth errors. Processor 15 may analyze the lightning flashes for one or more strikes (e.g., each lien of spidering for cloud to ground lightning, for each stroke of cloud to cloud lightning, etc.) over a pre-determined time interval (i.e. temporal filtering) and in a certain area (i.e., spatial filtering) for estimated lightning strike positions and estimated error in azimuth and range. The error calculation can be derived from the lightning sensor performance and by historical comparisons, comparing the detected lightning from the air with ground based lightning detectors/truth data. The estimated range may include the most error. The lightning error is represented by the size of lightning polygons 422 and 424 as an area where the lightning strikes may have occurred. As illustrated, cloud to cloud lightning is generally the most prevalent type of lightning in a cell and may be most indicative of cell activity. Therefore, according to other exemplary embodiments, lightning sensor 23 may detect only cloud to cloud lightning.

According to various exemplary embodiments, the cloud to cloud and cloud to ground lightning flashes can be detected by multiple lightning sensors tuned to detect lightning flashes at different frequency bands. For example, the system may include a sensor tuned to detect lightning flashes in a frequency band where cloud to cloud lightning typically occurs or is expected to occur as well as a sensor tuned to detect lightning flashes in another frequency band where cloud to ground lightning typically occurs or is expected to occur. Alternatively, the system may include a single sensor tuned to detect both cloud to cloud and cloud to earth lightning. In other exemplary embodiments, the system may include more than two sensors to detect lightning in more granular frequency bands or to redundantly detect lightning flashes in similar frequency bands to increase the likelihood of detection. It is noted the a frequency band where a certain type of lightning is expected to occur can change or be manually or automatically adjusted over time based on actual lightning data.

By correlating lightning data with radar reflectivity, weather radar system 410 can correctly identify whether a cell is growing or decaying. According to some exemplary embodiments, a file containing the lightning flash polygons and an estimation of the lightning flash error may be generated by computer code executed on processor 15, for example the computer code listed below:

```
Copyright Rockwell Collins, Inc. 2008
  public class FileCreator {
    private static final int MAX_LINE_CNT=100000;
    public static double
      RADIUS=Conversions.metersToNmiles(4000);
    private static final boolean NO_SORT=false;
    private static final boolean SORT_DATA=true;
    private static final long FIVE_MINUTES=5*60*1000;
    private static final int ONE_HOUR=60*60*1000;
    private static final int
      MAX_TIME_WITHIN_STROKE_FILE=ONE_HOUR;
    private static final int MAX_FLASHES=100000;
    private static final int MAX_STROKES=150000;
    private static final int MAX_FLASHES_CG=20000;
    private static final long MAX_CG_TIME_DIFF=1000; //
      millisec (1 second is the NLDN Flash duration limit)
    // (strokes are to be within 10 km of the first stroke to be
      considered part of same flash)
    private static final double
      MAX_CG_POS_DIFF=Conversions.metersToNmiles
      (10000); //Nmiles
    private static final int MAX_STROKES_
      TO_CHECK=1000; //TODO Guess
    private static final long MAX_TIME_DIFF=60000; // millisec (60000=60 sec)
    private static final double MAX_RANGE_ERROR_PER-
      CENT=20.; //+/-
    private static final double
      MAX_AZIMUTH_ERROR=Math.toRadians(2.); //+/-
    public FileCreator( ) {
    m_gui=new FileCreatorGUI( );
    m_flashesCg=new LightningData(MAX_FLASH-
      ES_CG);
    m_is FlashCgMatched=new boolean[MAX_FLASH-
      ES_CG];
    m_flashes=new LightningData(MAX_FLASHES);
    m_strokesCombined=new LightningData(MAX_
      STROKES);
    m_cgFlashMatch=new int[MAX_STROKES];
    m_flashReader=new LightningFlashTextReader( );
    m_strokeReader=new LightningMemoryArrayStro-
      keReader(MAX_STROKES);
    }
    protected static void begin(int aStart) {
    m_inputStrokes
      Directory=FileCreatorGUI.getInputStrokes
      Directory( );
    m_inputCgFlashDirectory=FileCreatorGUI.getInput
      FlashesDirectory( );
```

```
        if          (m_inputStrokesDirectory==null
            ||m_inputCgFlashDirectory==null) {
            m_logger.warning("input directory is null");
            return;
        }
        int strokeFileCnt=m_strokeReader.initFileList(m_input-
            StrokesDirectory,
            ONE_HOUR,
            MAX_TIME_WITHIN_STROKE_FILE);
        int flashFileCnt=m_flashReader.initFileList(m_inputCg-
            FlashDirectory);
        if (strokeFileCnt<=0 ||flashFileCnt<=0) {
            m_logger.warning("input file cnt is 0");
            return;
        }
        m_outputDirectory=m_gui.getOutputDirectory( );
        boolean is Ok=processFiles( );
        if (is Ok==false) {
            m_logger.warning("is Ok came back false from pro-
                cessFiles");
        }
        exit( );
    }
    public static void exit( ) {
        try {
            if (m_flashOut !=null) {
                m_flashOut.close( );
            }
            if (m_strokeOut !=null) {
                m_strokeOut.close( );
            }
        } catch (IOException anExc) {
            m_logger.log(Level.SEVERE, "Exception while clos-
                ing:", anExc);
            anExc.printStackTrace( );
        }
        System.exit(-1);
    }
    private static boolean processFiles( ) {
        try {
            m_dateOffset=FileCreatorGUI.getStartDate( );
            m_logger.info("m_dateOffset:"+m_dateOffset);
            m_strokeReader.setDeltaTime(m_dateOffset);
            long startTime=FileCreatorGUI.getStartTime( );
            long endTime=FileCreatorGUI.getEndTime( );
            int retValue=m_flashReader.readData(startTime,
                endTime,
                LightningFlashReader.UNKNOWN,
                LightningFlashReader.UNKNOWN,
                SORT_DATA,
                LightningTypeEnum.DO_NOT_CARE,
                m_flashesCg);
            if (retValue<0) {
                m_logger.warning("retValue      invalid      from
                    m_flashReader"+retValue);
                exit( );
            }
            m_numberOfFlashesCg=m_flashesCg.getNumberOf( );
            if (m_numberOfFlashesCg<=0) {
                m_logger.warning("Did not read any Flashes CG
                    data");
            }
            m_logger.info("CG time range:"+m_flashesCg.getTime
                (0)
                +" "+m_flashesCg.getTime(m_numberOfFlashesCg-
                    1)
                +"m_numberOfFlashesCg:"+m_numberOfFlashesCg);
            writeFlashesSortedFile( );
            long theTime=startTime;
            while (theTime<=endTime) {
                retValue=m_strokeReader.readData(theTime,
                    theTime+FIVE_MINUTES+MAX_CG_TIME_D-
                        IFF,
                    LightningFlashReader.UNKNOWN,
                    LightningFlashReader.UNKNOWN,
                    NO_SORT,
                    LightningTypeEnum.DO_NOT_CARE,
                    m_strokesCombined);
                if (retValue<0) {
                    m_logger.warning("retVal invalid from m_stro-
                        keReader"+retValue);
                }
                m_numberOfStrokesCombined=m_strokesCombined.
                    getNumberOf( );
                if (m_numberOfStrokesCombined<=0) {
                    m_logger.warning("Did not read any Strokes data");
                } else {
                    m_logger.info("Stroke time range:"+m_strokesCom-
                        bined.getTime(0)
                        +" "+m_strokesCombined.getTime(m_number-
                            OfStrokesCombined-1)
                        +"m_numberOfStrokesCombined:"+m_number-
                            OfStrokesCombined);
                    adjustFlashNumbers(theTime+FIVE_MINUTES-
                        1);
                    boolean is ErrorDetermined=determineError( );
                    if (is ErrorDetermined==false) {
                        m_logger.warning("is ErrorDetermined is false");
                        return false;
                    }
                    for (int i=0; i<m_numberOfStrokesCombined;
                        i++) {
                        m_cgFlashMatch[i]=-1;
                        // Assuming IC Until get it figured out if CG
                        if       (m_strokesCombined.getNumberOf-
                            StrokesInFlash(i)      !=LightningFlash.UN-
                                KNOWN) {
                            m_strokesCombined.setType(i,     Lightning-
                                TypeEnum.IC);
                        }
                    }
                }
                // At this point have LightningData containing Light-
                    ningFlash
                // corresponding to all the items in the stroke file with the
                    stroke
                // time, position, a flash number, number of flashes, and
                    flash index,
                // and an assumed type of IC
                findCG(theTime, theTime+FIVE_MINUTES-1);
                boolean is FlashFileCreated=createFlashFile( );
                if (is FlashFileCreated==false) {
                    m_logger.warning("is FlashFileCreated is false");
                    return false;
                }
                writeFlashesOutputFile( );
                writeStrokesOutputFile( );
                theTime+=FIVE_MINUTES;
                m_logger.info("theTime:"+theTime);
            }
            m_logger.info("Flashes with no match:");
            int noMatchCnt=0;
            for (int i=0; i<m_numberOfFlashesSortedUniqueCg; i++)
                {
                if (m_is FlashCgMatched[i] false) {
```

```
            m_logger.info("i:"+i
                +"pos:"+m_flashesSortedUniqueCg.getPosition
                    (i));
            noMatchCnt++;
        }
    }
    m_logger.info("CG Flash Cnt:"+m_numberOfFlashes-
        SortedUniqueCg
        +"No Match Cnt:"+noMatchCnt
        +"flash from stroke cnt:"+m_totalFlashCnt);
    return true;
    } catch (IllegalArgumentException anExc) {
    m_logger.log(Level.SEVERE, "Exception in process-
        Files:", anExc);
    anExc.printStackTrace( );
    return false;
    }
}
private   static   void   adjustFlashNumbers(long
    anEndTime) {
    int currentFlashNumber=-1;
    int currentFlashIndex;
    int currentNumberInFlash;
    int fileFlashNumber;
    int fileNumberInFlash;
    LightningFlash theFlash=new LightningFlash( );
    for (int i=0; i<m_numberOfStrokesCombined; i++) {
        fileFlashNumber=m_strokesCombined.getFlashNumber(i);
        fileNumberInFlash=m_strokesCombined.getNumber
            OfStrokesInFlash(i);
        if       (fileNumberInFlash==LightningFlash.
            UNKNOWN) {
        if (m_strokesCombined.getTime(i)>anEndTime) {
            break;
        }
        currentNumberInFlash=1;
        int firstStroke=0;
        int lastStroke=0;
        for (int j=1; j<MAX_STROKES_TO_CHECK; j++) {
            if (i+j>=m_numberOfStrokesCombined) {
                break;
            }
            if       (m_strokesCombined.getNumberOf-
                StrokesInFlash(i+j)==LightningFlash.UN-
                KNOWN
                &&   m_strokesCombined.getFlashNumber(i+j)
                fileFlashNumber) {
                lastStroke=j;
                currentNumberInFlash++;
            }
        }
        currentFlashNumber++;
        currentFlashIndex=0;
        m_logger.info("currentFlashNumber:"+currentFlash-
            Number
            +"numberWithFlash:"+currentNumberInFlash);
        for (int j=firstStroke; j<=lastStroke; j++) {
            if (m_strokesCombined.getNumberOfStrokesInFlash
                (i+j)==LightningFlash.UNKNOWN
                &&      m_strokesCombined.getFlashNumber
                    (i+j)==fileFlashNumber) {
                m_strokesCombined.getItem(i+j, theFlash);
                theFlash.setFlashInfo(
                    currentFlashNumber,
                    currentNumberInFlash,
                    currentFlashIndex);
                theFlash.setMultiplicity(currentNumberInFlash);
                m_strokesCombined.setItem(i+j, theFlash);
                //m_logger.fine("i+j:"+(i+j)
                //    +"flashNumber:"+m_strokesCombined.getFlash-
                        Number(i+j));
                currentFlashIndex++;
            }
        }
    } else {
        if (m_logger.is Loggable(Level.FINEST)) {
            m_logger.finest("processFiles( )i:"+i+"not equal to
                unknown"
                +"theFlash.getFlashNumber( )"
                +theFlash.getFlashNumber( ));
        }
    }
    }
}
private static void findCG(long aBegTime, long anEnd-
    Time) {
    LightningFlash strokeCombined=new LightningFlash( );
    LightningFlash flashCg=new LightningFlash( );
    int matchCnt=0;
    int matchCntFor10=0;
    int matchCntFor15=0;
    int noMatchCnt=0;
    int prevFlashIndex;
    long deltaTime=-1;
    long cgTime;
    long strokeTime;
    FlightPoint strokeCombinedPosition=new FlightPoint( );
    FlightPoint flashCgPosition=new FlightPoint( );
    for   (int   i=0;   i<m_numberOfFlashesSortedUniqueCg;
        i++) {
        m_flashesSortedUniqueCg.getItem(i, flashCg);
        long prevDeltaTime=99999999;
        double prevDistance=Double.MAX_VALUE;
        long minDeltaTime=Long.MAX_VALUE;
        double minDistance=Double.MAX_VALUE;
        prevFlashIndex=-1;
        cgTime=flashCg.getTime( );
        if (cgTime<aBegTime) {
            continue;
        }
        if (cgTime>anEndTime) {
            break;
        }
        for (int j=0; j<m_numberOfStrokesCombined; j++) {
            m_strokesCombined.getItem(j, strokeCombined);
            if       (strokeCombined.getIndexOfStrokesWithin
                Flash( )==0) {
                // first stroke within flash and type not already CG
                strokeTime=strokeCombined.getTime( );
                deltaTime=Math.abs(cgTime-strokeTime);
                if (deltaTime<minDeltaTime) {
                    minDeltaTime=deltaTime;
                }
                if (deltaTime>MAX_CGTIME_DIFF) {
                    if (strokeTime>cgTime) {
                        // no reason to check additional stroke data
                        // should be in increasing time order and just
                            getting
                        // further away from cgTime
                        m_logger.info("findCG(                       )
                            deltaTime>MAX_CG_TIME_DIFF,"
                            +deltaTime
                            +"i,j:" i+","+j);
                        break;
```

```
            }
        } else {
            // within time frame, check the distance
            strokeCombined.getPosition(strokeCombinedPo-
                sition);
            flashCg.getPosition(flashCgPosition);
            double[ ] distHeading=FlightPointMethods. rhum-
                bLineDistanceTo(
                strokeCombinedPosition,
                flashCgPosition);
            double distance=distHeading[0];
            if (distance<minDistance) {
                minDistance=distance;
            }
            if (distance>MAX_CG_POS_DIFF) {
                // within the time, but the position is too far away
                m_logger.info("findCG(                    )
                    distance>MAX_CG_POS_DIFF,"
                    +distance
                    +"i,j:" i+","+j);
            } else {
                // within the distance
                if    (prevFlashIndex>=0)    &&
                    deltaTime>prevDeltaTime) {
                    // getting further away in time,
                    break;
                }
                m_logger.info("findCG( ) within delta time:"
                    +deltaTime+
                    "and distance:"
                    +distance
                    +"i,j:" i+","+j);
                prevFlashIndex=j;
                prevDeltaTime=deltaTime;
                prevDistance=distance;
            }
        }
    }
}
if (prevFlashIndex>=0) {
    if (strokeCombined.getTypeEnum( )==LightningTypeE-
        num.CG) {
        m_logger.warning("Match  for  Cg:"+i+"Previously
            Matched");
    }
    m_logger.info("Match for Cg:"+i
        +"prevFlashIndex:"+prevFlashIndex
        +"cgTime:"+cgTime
        +"prevDeltaTime:"+prevDeltaTime
        +"prevDistance:"+prevDistance);
    storeCgInfo(i, prevFlashIndex);
    matchCnt++;
} else {
    m_logger.info("No Match found for Cg:"+i
        +"cgTime:"+cgTime
        +"minDeltaTime:"+minDeltaTime
        +"minDistance:"+minDistance);
    noMatchCnt++;
    if (minDistance<=10.) {
        matchCntFor10++;
    } else if (minDistance<=15.) {
        matchCntFor15++;
    }
}
}
}
m_logger.info("matchCnt: "+matchCnt
    +" noMatchCnt:"+noMatchCnt
    +"matchCntFor10:"+matchCntFor10
    +"matchCntFor15:"+matchCntFor15);
}
private static void storeCgInfo(int aCgFlashIndex, int
    aStrokeCombinedIndex) {
    LightningFlash strokeCombined=new LightningFlash( );
    FlightPoint strokeCombinedPosition=new FlightPoint( );
    LightningFlash flashCg=new LightningFlash( );
    FlightPoint flashCgPosition=new FlightPoint( );
    m_strokesCombined.getItem(aStrokeCombinedIndex,
        strokeCombined);
    m_flashesSortedUniqueCg.getItem(aCgFlashIndex,
        flashCg);
    long  timeDiff=strokeCombined.getTimeQ-flashCg.get-
        Time( );
    strokeCombined.getPosition(strokeCombinedPosition);
    flashCg.getPosition(flashCgPosition);
    double[   ]   distHeading=FlightPointMethods.rhum-
        bLineDistanceTo(
        strokeCombinedPosition,
        flashCgPosition);
    if (distHeading[0]>MAX_CG_POS_DIFF) {
        m_logger.warning("storeCgInfo( ) aCgFlashIndex:"+
            aCgFlashIndex
            +"aStrokeCombinedIndex:"+aStrokeCombinedIn-
                dex
            +"timeDiff:"+timeDiff
            +"heading:"+Math.toDegrees(distHeading[1])
            +"distance:"+distHeading[0]
            +">"+MAX_CG_POS_DIFF);
    } else {
        m_logger.info("storeCgInfo( ) aCgFlashIndex:"+aCg-
            FlashIndex
            +"aStrokeCombinedIndex:"+aStrokeCombinedIn-
                dex
            +"timeDiff:"+timeDiff
            +"heading:"+Math.toDegrees(distHeading[1])
            +"distance:"+distHeading[0]);
    }
    int       numberOfStrokesInFlash=strokeCombined.
        getNumberOfStrokesInFlash( );
    int cnt=0;
    int k=aStrokeCombinedIndex;
    int flashNumber=strokeCombined.getFlashNumber( );
    while    (cnt<numberOfStrokesInFlash       &&
        k<m_numberOfStrokesCombined) {
        int  combinedFileFlashNumber=m_strokesCombined.
            getFlashNumber(k);
        if (combinedFileFlashNumber==flashNumber) {
            cnt++;
            m_strokesCombined.getItem(k, strokeCombined);
            strokeCombined.setType(LightningTypeEnum.CG);
            strokeCombined.setAmplitude(
                flashCg.getAmplitude( ));
            m_strokesCombined.setItem(k, strokeCombined);
            if (m_logger.is Loggable(Level.FINE)) {
                m_logger.fine("cnt:"+cnt  +"  "+m_strokesCom-
                    bined.toString(k));
            }
            m_cgFlashMatch[k]=aCgFlashIndex;
            m_isFlashCgMatched[aCgFlashIndex]=true;
        }
        k++;
    }
}
```

```
    private static FlightPoint determineVehPos(long aTime,
boolean aRestart) {
    if (aTime<=0) {
        m_logger.severe("aTime:"+aTime+"<=0");
        System.exit(-1);
    }
    if (aRestart) {
        double vehLatitude=FileCreatorGUI.getLatitude( );
        double vehLongitude=FileCreatorGUI.getLongitude( );
        m_vehPosition=new   FlightPoint(Math.toRadians(ve-
            hLatitude),
            Math.toRadians(vehLongitude), 0.);
        m_vehSpeed=FileCreatorGUI.getSpeed( );
        m_vehDistanceToMove=(m_vehSpeed/(1000*60*60))
            *MAX_TIME_DIFF;
        m_logger.info("determineVehPos(    )vehDistanceTo-
            Move:"+m_vehDistanceToMove
            +"vehPos:"+m_vehPosition);
        m_vehHeading=Math.toRadians(FileCreatorGUI.get-
            Heading( ));
        m_startTime=FileCreatorGUI.getStartTime( );
        m_lastVehPos=new FlightPoint(m_vehPosition);
        m_positionTime=FileCreatorGUI.getPositionTime( );
        long deltaTime=aTime-m_positionTime;
        double     distanceToMove=m_vehSpeed*(Math.abs
            (deltaTime)/(1000*60*60));
        if (Math.abs(distanceToMove)>50) {
            m_logger.warning("aRestart distanceToMove:"+dis-
                tanceToMove
                +"m_vehSpeed:"+m_vehSpeed
                +"m_positionTime:"+m_positionTime+
                "m_lastVehPosTime:"+m_lastVehPosTime+
                "aTime:"+aTime);
        }
        if (deltaTime>0) {
            FlightPointMethods.moveRhumbLine(m_lastVeh-
                Pos, distanceToMove, m_vehHeading);
        } else {
            FlightPointMethods.moveRhumbLine(m_lastVeh-
                Pos,
                distanceToMove,
                (Math.PI-m_vehHeading));
        }
        m_lastVehPosTime=aTime;
        m_logger.info("determineVehPos( )  m_lastVehPos-
            Time:"+m_lastVehPosTime
            +"m_lastVehPos:"+m_lastVehPos);
    } else if (aTime<m_lastVehPosTime) {
        m_logger.warning("1st veh time is less than 1st flash
            time, ADJUSTING"
            +"delta:"+(m_positionTime-aTime));
        double distanceToMove=(m_vehSpeed/(1000*60*60))
            * (m_lastVehPosTime-aTime+1);
        if (Math.abs(distanceToMove)>50) {
            m_logger.warning("distanceToMove:"+distanceTo-
                Move
                +"m_vehSpeed:"+m_vehSpeed
                +"m_lastVehPosTime:"+m_lastVehPosTime
                +"aTime:"+aTime);
        }
        FlightPointMethods.moveRhumbLine(m_lastVehPos,
            distanceToMove,
            (m_vehHeading-Math.PI));
        m_lastVehPosTime=aTime;
        m_logger.info("distanceToMove:"+distanceToMove+
            "vehPos:"
            m_lastVehPos);
    } else if (aTime-m_lastVehPosTime>=MAXTIME_D-
        IFF) {
        double distanceToMove=(m_vehSpeed/(1000*60*60))
            * (aTime-m_lastVehPosTime+1);
        FlightPointMethods.moveRhumbLine(m_lastVehPos,
            distanceToMove,
            m_vehHeading);
        m_lastVehPosTime=aTime;
        m_logger.info("determineVehPos(   )distanceToMove:
            "+distanceToMove
            +"vehPos:"+m_lastVehPos);
    }
    return m_lastVehPos;
}
private static boolean determineError( ) {
    if (m_numberOfStrokesCombined==0) {
        m_logger.info("determineError( )number of Flashes
            Combined=0");
        return false;
    }
    LightningFlash strokeCombined=new LightningFlash( );
    FlightPoint strokeCombinedPosition=new FlightPoint( );
    m_strokesCombined.getItem(0, strokeCombined);
    long strokeTime=strokeCombined.getTime( );
    double minDistance=0.;
    double maxDistance=0.;
    double minHeading=0.;
    double maxHeading=0.;
    final int NUMBER_OF_ERROR_VERTICES=4;
    FlightPoint[ ] errorVertices=new   FlightPoint[NUM-
        BER_OF_ERROR_VERTICES];
    for (int i=0; i<NUMBER_OF_ERROR_VERTICES; i++)
        {
        errorVertices[i]=new FlightPoint( );
    }
    FlightPoint vehPos=null;
    for (int i=0; i<m_numberOfStrokesCombined; i++);
        m_strokesCombined.getItem(i, strokeCombined);
        strokeTime=strokeCombined.getTime( );
        strokeCombined.getPosition(strokeCombinedPosi-
            tion);
        if (i==0) {
            vehPos=determineVehPos(strokeTime, true);
        } else {
            vehPos=determineVehPos(strokeTime, false);
        }
        double[  ]   distHeading=FlightPointMethods.rhum-
            bLineDistanceTo(
            vehPos, strokeCombinedPosition);
        strokeCombined.setRangeAndBearing(distHeading[0],
            distHeading[1]);
        minDistance=distHeading[0];
        maxDistance=distHeading[0];
        maxHeading=distHeading[1];
        minHeading=distHeading[1];
        minDistance *=(100.-MAX_RANGE_ERROR_PER-
            CENT)/100.;
        maxDistance *=(100.+MAX_RANGE_ERROR_PER-
            CENT)/100.;
        maxHeading+=MAX_AZIMUTH_ERROR;
        minHeading-=MAX_AZIMUTH_ERROR;
        for (int j=0; j<NUMBER_OF_ERROR_VERTICES;
            j++) {
            errorVertices[j].moveTo(vehPos);
        }
        FlightPointMethods.moveRhumbLine(errorVertices
            [0], minDistance, minHeading);
```

```
FlightPointMethods.moveRhumbLine(errorVertices
    [1], maxDistance, minHeading);
FlightPointMethods.moveRhumbLine(errorVertices
    [2], maxDistance, maxHeading);
FlightPointMethods.moveRhumbLine(errorVertices
    [3], minDistance, maxHeading);
strokeCombined.setErrorInfo(NUMBEROF_ERROR-
    VERTICES, errorVertices);
m_strokesCombined.setItem(i, strokeCombined);
if (i % 1000==0) {
    m_logger.info("determineError( )i:"+i
        +"minDistance:"+minDistance
        +"maxDistance:"+maxDistance
        +"deltaDistance:"+(maxDistance−minDistance)
        +"minHeading:"+Math.toDegrees(minHeading)
        +"maxHeading:"+Math.toDegrees(maxHeading)
        +"m_strokesCombined:"+m_strokesCombined-
            .toString(i));
    }
}
return true;
}
private static boolean createFlashFile( ) {
int flashNumber=−1;
int numberOfStrokes=−1;
int strokeIndex=−1;
double maxMaxDistanceFromFirst=0.;
int maxDistanceFlashNumber=0;
long maxTimeDiff=0;
int maxTimeFlashNumber=0;
FlightPoint flashCgPosition=new FlightPoint( );
FlightPoint flashPosition=new FlightPoint( );
final int MAX_VERTICES=8;
FlightPoint[ ] vertices=new FlightPoint[MAX_VERTI-
    CES];
for (int k=0; k<MAX_VERTICES; k++) {
    vertices[k]=new FlightPoint( );
}
m_logger.info("createFlashFile(    )   m_numberOf-
    StrokesCombined:"
    +m_numberOfStrokesCombined);
m_flashes.reset( );
m_numberOfFlashesCombined=0;
int i=0;
while (i<m_numberOfStrokesCombined) {
    LightningFlash theFlash=new LightningFlash( );
    m_strokesCombined.getItem(i, theFlash);
    flashNumber=theFlash.getFlashNumber( );
    numberOfStrokes=theFlash.getNumberOfStrokesIn
        Flash( );
    strokeIndex=theFlash.getIndexOfStrokesWithinFlash(
        );
    if (strokeIndex==0) {
        i++;
        continue;
    }
    if (numberOfStrokes==LightningFlash.UNKNOWN) {
        // extra check to make sure stroke data had been set
        i++;
        continue;
    }
    FlightPoint[ ] strokePositions=new FlightPoint[num-
        berOfStrokes];
    int numberFound=0;
    int j=0;
    int notSameFlash=−1;
    while     (j<m_numberOfStrokesCombined     &&
        numberFound<numberOfStrokes) {
        int itemFlashNumber=m_strokesCombined.getFlash
            Number(i+j);
        if (itemFlashNumber==flashNumber) {
            strokePositions[numberFound]=m_strokesCom-
                bined.getPosition(i+j);
            numberFound++;
        } else if (notSameFlash<0) {
            notSameFlash=j;
        }
        j++;
    }
    LightningFlash cgFlash=new LightningFlash( );
    FlightPoint
        determinedPosition=determinePositionForFlash(
        numberOfStrokes,
        strokePositions);
    if (m_cgFlashMatch[i]>=0) {
        // Has previously found a CG Flash match
        m_flashesSortedUniqueCg.getItem(m_cgFlash-
            Match[i], cgFlash);
        cgFlash.getPosition(flashCgPosition);
        theFlash.setTime(cgFlash.getTime( ));
        theFlash.setLastTime(cgFlash.getLastTime( ));
        theFlash.setType(LightningTypeEnum.CG);
        flashCgPosition.setAltitude(determinedPosition.
            getAltitude( ));
        theFlash.setPosition(flashCgPosition);
        double[ ]  distHeading=FlightPointMethods.rhum-
            bLineDistanceTo(
            flashCgPosition,
            determinedPosition);
        m_logger.info("createFlashFile(   )CG    dist:"+dist-
            Heading[0]
            +"heading:"+Math.toDegrees(distHeading[1])
            +"cgFlash.getTimeQ:"
            +DateTimeConversions.getTimeH-
                HmmssWithColons(cgFlash.getTime( )
            +"flashCgPosition:"+flashCgPosition);
    } else {
        theFlash.setPosition(determinedPosition);
        m_logger.info("createFlashFile(   )NO    MATCH,
            determinedPosition:"
            +determinedPosition);
    }
    theFlash.getPosition(flashPosition);
    int    numberOfVertices=FlightPointMethods.create
        VerticesFromPositionAndRadius(
        flashPosition,
        RADIUS,
        MAX_VERTICES,
        vertices);
    theFlash.setVerticesInfo(
        numberOfVertices,
        vertices);
    m_logger.fine("createFlashFile(   )numberOfError-
        Vertices:"
        +theFlash.getNumberOfErrorVertices( )
        +"numberOfVertices:"+numberOfVertices
        +"flashPos:"+flashPosition);
    m_flashes.add(theFlash);
    if (notSameFlash>0) {
        i+=notSameFlash;
    } else if (numberOfStrokes>0) {
        i+=numberOfStrokes;
    } else {
        i++;
    }
}
```

```
        }
        m_numberOfFlashesCombined=m_flashes.getNumber
            Of( );
        m_logger.info("maxTime    flashNumber:"+maxTime-
            FlashNumber
            +"maxTimeDiff:"+maxTimeDiff
            +"maxDist flashNumber:"+maxDistanceFlashNum-
                ber
            +"maxMaxDist:"+maxMaxDistanceFromFirst)
            );
        m_totalFlashCnt+=m_numberOfFlashesCombined;
        return true;
    }
    private static FlightPoint determinePositionForFlash(
        int aNumberOfStrokes,
        FlightPoint[ ] aStrokePositions) {
        return aStrokePositions[0]; // Temporarily using the
            position of 1st stroke
    }
    private static void writeFlashesSortedFile( ) {
        m_flashesSortedUniqueCg=new         LightningData
            (m_numberOfFlashesCg);
        FlightPoint prevFlashPos=new FlightPoint( );
        FlightPoint currFlashPos=new FlightPoint( );
        try {
            long firstFlashTimeOutput=-1;
            long lastFlashTimeOutput=-1;
            int sameCnt=0;
            LightningFlash prevFlash=new LightningFlash( );
            LightningFlash currFlash=new LightningFlash( );
            int lineCnt=0;
            for (int i=0; i<m_numberOfFlashesCg; i++) {
                m_flashesCg.getItem(i, currFlash);
                if (i==0) {
                    firstFlashTimeOutput=m_flashesCg.getTime
                        (i);
                    m_flashesCg.getItem(0, prevFlash);
                } else {
                    if (prevFlash.getTime( )==currFlash.
                        getTime( )) {
                        prevFlash.getPosition(prevFlashPos);
                        currFlash.getPosition(currFlashPos);
                        if (prevFlashPos.is Equal(currFlashPos)) {
                            // same flash, do not write
                            sameCnt++;
                            continue;
                        }
                    }
                }
                m_flashesSortedUniqueCg.add(currFlash);
                m_flashesCg.getItem(i, prevFlash);
                String line=m_flashesCg.toFileString(i);
                if                 (m_flashOut==null
                    ||lineCnt>=MAX_LINE_CNT) {
                    setUpFlashWriter(m_flashesCg.getTime(i),
                        "flashesSorted");
                    lineCnt=0;
                }
                lineCnt++;
                m_flashOut.write(line);
                m_flashOut.newLine( );
                if (i % 500000==1) {
                    m_logger.info("Writing    i:"+i+"lineCnt:"+li-
                        neCnt);
                }
                if (i==m_numberOfFlashesCg-1) {
                    lastFlashTimeOutput=m_flashesCg.getTime(i);
                    m_logger.info("writeFlashesSortedFile(  )first,
                        last time:"
                        +firstFlashTimeOutput+","
                        +lastFlashTimeOutput);
                }
            }
            m_numberOfFlashesSortedUniqueCg=m_flashes
                SortedUniqueCg.getNumberOf( );
            m_flashOut.close( );
            m_flashOut=null;
            m_logger.info("Done Writing");
            m_logger.info("Number   of   CG:"+m_numberOf-
                FlashesCg
                +"sameCnt:"+sameCnt);
        } catch (IOException anExc) {
            m_logger.log(Level.WARNING, " ", anExc);
        }
    }
    private static void setUpFlashWriter(long aTime, String
        aDescriptor) {
        try {
            if (m_flashOut !=null) {
                m_flashOut.close( );
            }
            StringBuffer buffer=new StringBuffer(50);
            buffer.append(m_outputDirectory);
            buffer.append(File.separator);
            buffer.append(aDescriptor);
            buffer.append("_");
            buffer.append(DateTimeConversions.getyyyy_M-
                M_dd_HHmm(aTime));
            buffer.append(".txt");
            String fileName=buffer.toString( );
            m_logger.info("Writing to:"+fileName
                +" "+m_numberOfFlashesCombined);
            m_flashWriter=new File Writer(fileName);
            m_flashOut=new BufferedWriter(m_flashWriter);
        } catch (IOException anExc) {
            anExc.printStackTrace( );
            m_logger.log(Level.WARNING, " ", anExc);
        }
    }
    private static void writeFlashesOutputFile( ) {
        try {
            if (m_numberOfFlashesCombined==0) {
                // nothing to output
                return;
            }
            int numberOfCg=0;
            int numberOfIc=0;
            int numberOfCgWith1=0;
            int numberOfIcWith1=0;
            long firstFlashTimeOutput=-1;
            for (int i=0; i<m_numberOfFlashesCombined;
                i++) {
                if (i==0) {
                    firstFlashTimeOutput=m_flashes.getTime(i);
                }
                LightningTypeEnum   type=m_flashes.getType
                    (i);
                int multiplicity=m_flashes.getMultiplicity(i);
                if (type==LightningTypeEnum.CG) {
                    numberOfCg++;
                    if (multiplicity==1) {
                        numberOfCgWith1++;
                    }
                } else if (type==LightningTypeEnum.IC) {
```

```
        numberOfIc++;
        if (multiplicity==1) {
            numberOfIcWith1++;
        }
    }
    String line=m_flashes.toFileString(i);
    if (m_flashOut==null
        ||(m_flashLineCnt>=MAX_LINE_CNT   &&
        i==0)) {
        // starting a new file at start and at start of time
        interval
        // when already at or past max line cnt
        setUpFlashWriter(m_flashes.getTime(i),
        "flashesCombined"+m_flashFileCnt);
        m_flashLineCnt=0;
        m_flashFileCnt++;
    }
    m_flashOut.write(line);
    m_flashOut.newLine( );
    m_flashLineCnt++;
    if (i % 500000==1) {
        m_logger.info("Writing i:"+i);
    }
    if (i==m_numberOfFlashesCombined-1) {
        m_lastFlashTimeOutput=m_flashes.getTime
        (i);
        m_logger.info("writeFlashesOutput(  )first,last
        time:"
        +firstFlashTimeOutput+","
        +m_lastFlashTimeOutput);
    }
}
m_logger.info("Done Writing");
m_logger.info("Number of CG:"+numberOfCg
    +"Number of CG with 1:"+numberOfCgWith1
    +"Number of IC:"+numberOfIc
    +"Number of IC with 1:"+numberOfIcWith1);
} catch (IOException anExc) {
    m_logger.log(Level.WARNING, " ", anExc);
}
}
private static void setUpStrokeWriter(long aTime,
    String aDescriptor) {
    try {
        if (m_strokeOut !=null) {
            m_strokeOut.close( );
        }
        StringBuffer buffer=new StringBuffer(50);
        buffer.append(m_outputDirectory);
        buffer.append(File.separator);
        buffer.append(aDescriptor);
        buffer.append("_");
        buffer.append(DateTimeConversions.getyyyy_M-
            M_dd_HHmm(aTime));
        buffer.append(".txt");
        String fileName=buffer.toString( );
        m_logger.info("setUpStrokeWriter Writing to:"+
            fileName
            +" "+m_numberOfStrokesCombined);
        m_strokeWriter=new File Writer(fileName);
        m_strokeOut=new      BufferedWriter(m_stroke-
            Writer);
    } catch (IOException anExc) {
        anExc.printStackTrace( );
        m_logger.log(Level.WARNING, " ", anExc);
    }
}
}
    private static void writeStrokesOutputFile( ) {
        try {
            if (m_numberOfStrokesCombined==0) {
                // nothing to output
                m_logger.warning("no strokes to output");
                return;
            }
            LightningFlash strokeCombined=new Lightning-
                Flash( );
            long fileTime=0;
            for (int i=0; i<m_numberOfStrokesCombined;
                i++) {
                m_strokesCombined.getItem(i,     strokeCom-
                    bined);
                String line=strokeCombined.toFileString( );
                fileTime=strokeCombined.getTime( );
                if (m_strokeOut==null
                    ||(m_strokeLineCnt>=MAX_LINE_CNT   &&
                    i==0)) {
                    // starting a new file at start and at start of time
                    interval
                    // when already at or past max line cnt
                    setUpStrokeWriter(fileTime,     "strokesCom-
                        bined"+m_strokeFileCnt);
                    m_strokeLineCnt=0;
                    m_strokeFileCnt++;
                }
                m_strokeOut.write(line);
                m_strokeOut.newLine( );
                m_strokeLineCnt++;
                if (i % 50000==0) {
                    m_logger.info("Writing Strokes i:"+i
                        +"lineCnt:"+m_strokeLineCnt
                        +"m_strokeFileCnt:"+m_strokeFileCnt
                        +"fileTime:"+fileTime);
                }
            }
            m_logger.info("Done Writing");
        } catch (IOException anExc) {
            m_logger.log(Level.WARNING, " ", anExc);
        }
    }
    public static void main(String anArgArray[ ]) {
        try {
            Configuration.setNodeName("/lightningFlashFi-
                leCreator");
            Level theLevel=Level.INFO;
            String MESSAGE_LOG_FILE_NAME=
Configuration.getDefaultMessageLogBegFilename( );
MessageLogData.setUp(MESSAGE_LOG_FILE_
    NAME, theLevel);
FileCreator creator=new FileCreator( );
        } catch (OutOfMemoryError anErr) {
            m_logger.log(Level.SEVERE,   "OutOfMemoryEr-
                ror", anErr);
            System.out.println("OutOfMemoryError"+anEr-
                r.getMessage( ));
            System.exit(-1);
        }
    }
}
```

The above code is exemplary only and can be compiled to operate on a processing platform associated with system 10.

Figure 14:
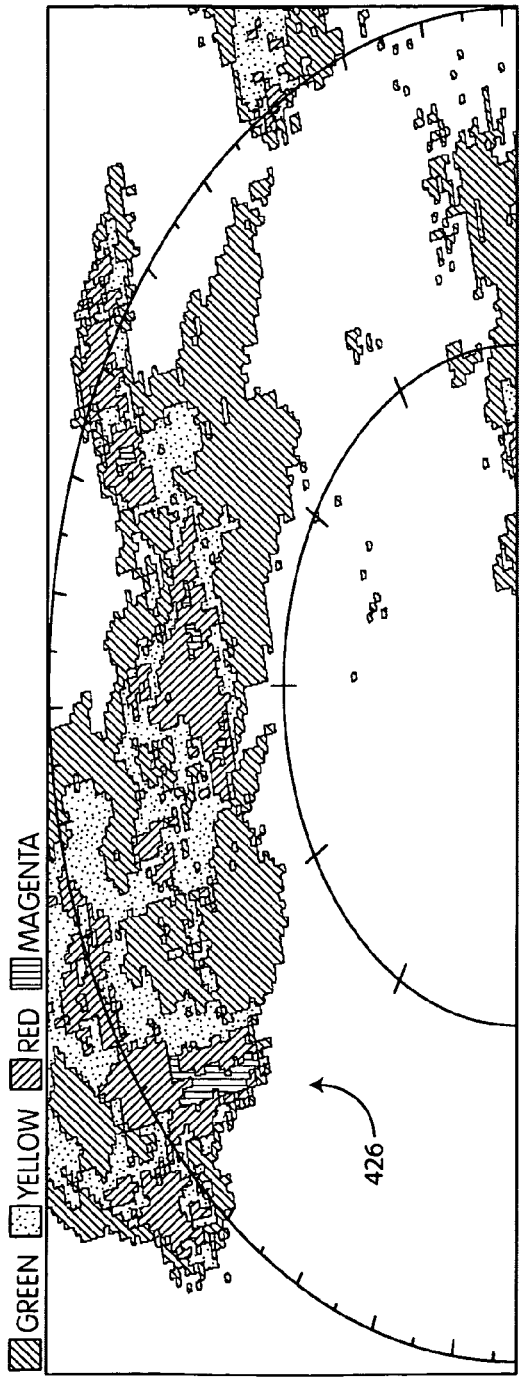
FIG. 14 is a radar image of the cell according to an exemplary embodiment.
Figure 15:
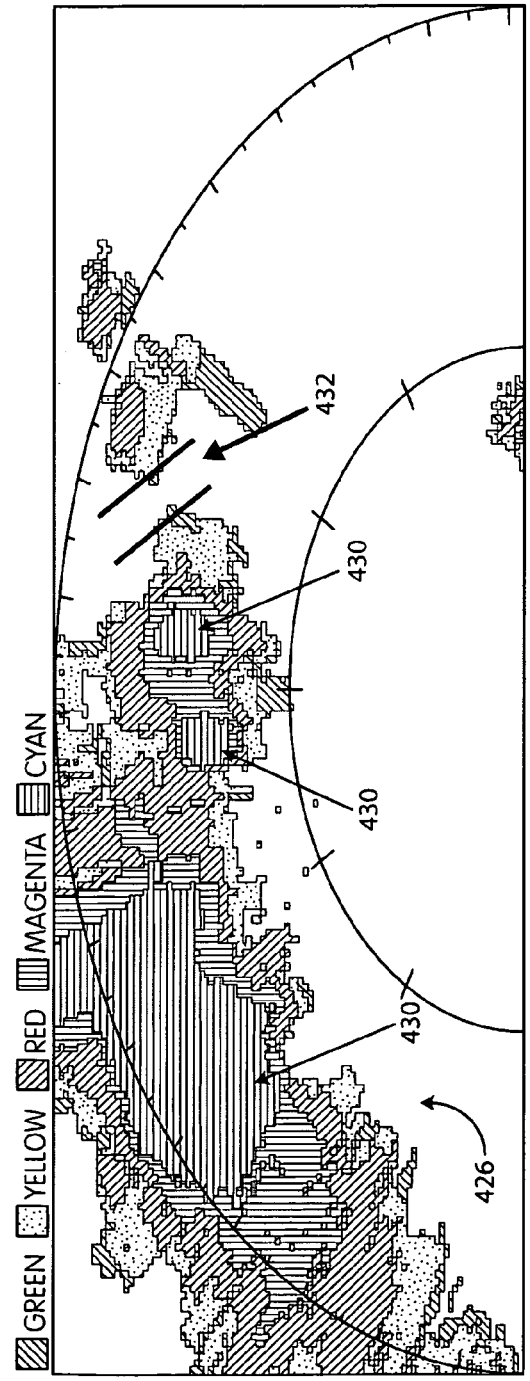
FIG. 15 is a radar image of the cell including filtered lightning data according to an exemplary embodiment.

FIG. 14 is a radar image of a cell 426 showing various areas of reflectivity according to an exemplary embodiment. The best penetration point for an aircraft may be difficult to ascertain using the radar data alone. FIG. 15 is a lightning image showing only lightning data from cell 426. The color indicates the frequency of lightning strikes over a predetermined period of time (i.e., a temporal filter) with green representing the fewest number and cyan representing the greatest number of strikes.

Locations or positions of greatest lightning activity or flashes 430 mapped on the radar data (e.g., as the color cyan, by a textual symbol, etc.) may represent thunderstorm cores or highly convective regions. The lightning map may provide a clearer picture of a penetration point 432 in cell 426, a location that an aircraft could more safely proceed through cell 426 and avoid convective or growing regions. Penetration point 432 may be a generally non-convective corridor or a less hazardous decaying region of cell 426 or a weather frontal line. When a convective cell is detected, weather radar system 410 may perform queuing on the cell and direct a weather radar beam to the position of the cell to obtain more detailed radar data (e.g., reflectivity, spectral width, etc.).

When the lightning is combined with the reflectivity image, it can be used to identify areas that are likely electrically charged. The identified areas could be a decaying cell or anvil blow-off area with 30 dBZ reflectivity above the freezing level and a very low flash rate (e.g., a location with one strike in the last 10 minutes). The electrically charged area is associated with reflectivity, but may not be associated with a convective core or with significant turbulence. The electrically charged area may pose a risk of aircraft induced lightning strike.

The filtered lightning and reflectivity hazard information can be compared with the aircraft flight path as received from the Flight Management Computer. The hazard information may be filtered from the display (i.e. not displayed) if the hazard is not predicted to intersect with the aircraft flight path. Conversely, the hazard may be displayed if it is predicted to be in close proximity to the aircraft flight path (e.g., an aircraft flight path over a growing convective core).

According to other exemplary embodiments, the radar map may be additionally spatially filtered to only display reflectivity data in regions that the lightning map indicates as being highly convective or growing so that only the most pertinent data related to safer operation of the aircraft is displayed. According to other exemplary embodiments, the lightning map may be additionally spatially filtered to only display lightning data in regions that the radar map indicates as having the greatest reflectivity (and possibly the most convective activity or growth) so that only the most pertinent data related to safer operation of the aircraft is displayed.

Figure 16:
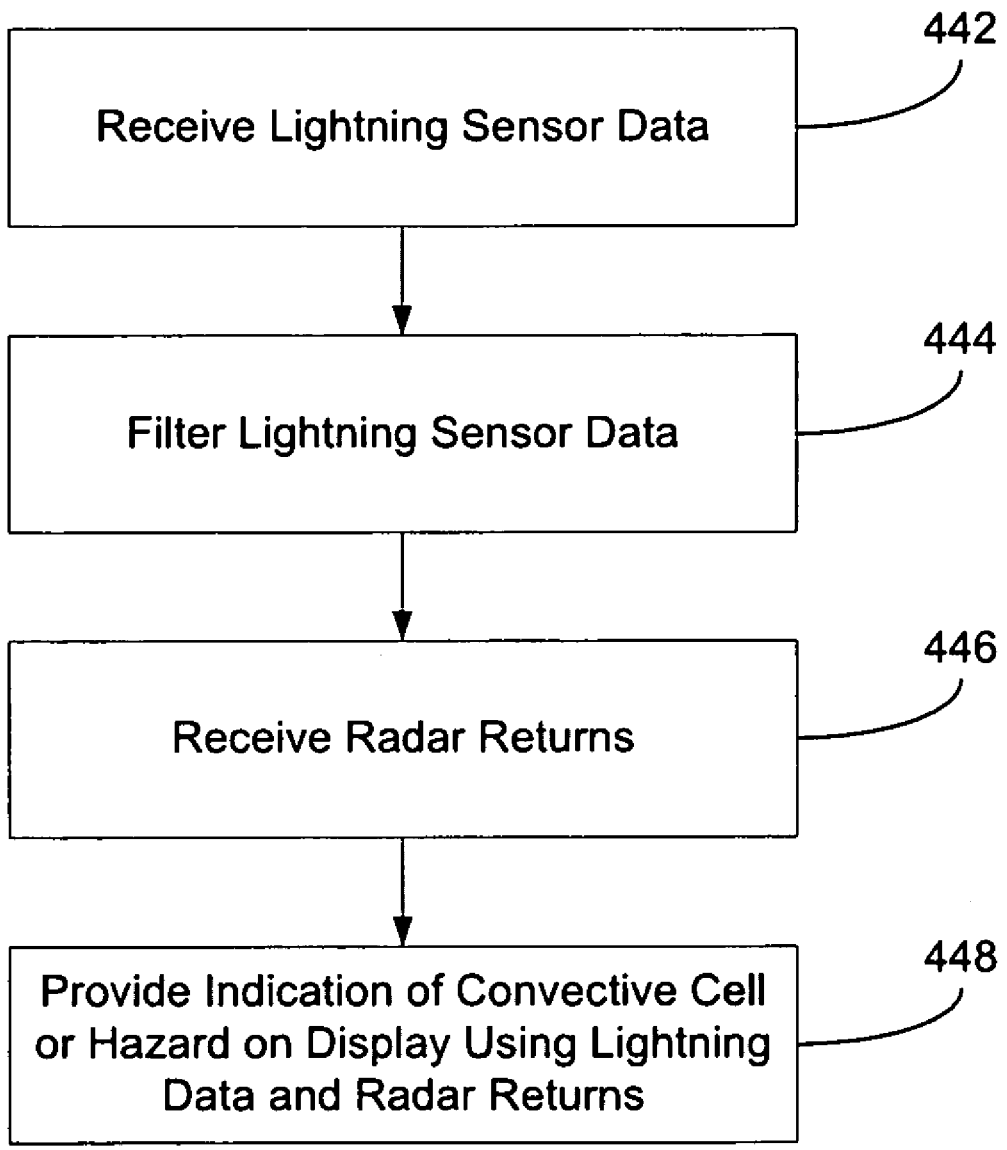
FIG. 16 is a flow diagram showing operation of the weather radar system illustrated in FIG. 11 in accordance with another exemplary embodiment.

FIG. 16 is a flow diagram showing operation of the weather radar system illustrated in FIG. 11 in accordance with an exemplary embodiment. Processor 15 receives data from lightning sensor 23 (step 442) and passes the data to convective cell or hazard detector 24. The data from lightning sensor 23 is filtered by temporal filter 412 and spatial filter 414 (step 444). The lightning data may be accumulated in memory 13 over time before and/or after filtering. Memory 13 and/or processor 15 receives radar return data from radar antenna 11 (step 446). Convective cell or hazard detector 24 uses the filtered lightning data and radar return data to provide indication of convective cells or hazards on display 16 (step 448).

While weather system 410 is shown to use a single spatial and a single temporal filter for lightning, according to other exemplary embodiments, multiple temporal or spatial lightning filters could be used. According to other exemplary embodiments, only spatial filters may be used or only temporal filters may be used. According to other exemplary embodiments, weather system 410 may include a spatial filter for radar reflectivity to limit the display of radar activity to the most relevant or active data.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system for an aircraft, comprising:
   an input for receiving lightning detection data on the aircraft; and
   processing electronics coupled to the input, receiving weather radar data, and receiving the lightning detection data via the input, the processing electronics providing temporal, spatial, or both temporal and spatial filtering of the lightning detection data to provide filtered data, the processing electronics using the filtered data to map a presence of lightning to a geographic area including an error factor, the processing electronics determining a position of a convective cell by correlating the weather radar data and the geographic area including the error factor.

2. The weather radar system of claim 1, wherein the processing electronics includes a system of rules to determine which of a plurality of weather events will be correlated with new lightning detection data received from the input.

3. The weather radar system of claim 1, wherein the processing electronics determines a direction to the convective cell based on the determined position of the convective cell.

4. The weather radar system of claim 1, wherein the processing electronics causes the weather radar system to analyze geographic regions in response to determining the position of the convective cell.

5. The weather radar system of claim 1, wherein the processing electronics causes the weather radar system for the aircraft to provide a weather radar beam to the position in response to the filtered data.

6. The weather radar system of claim 1, further comprising a display wherein a cell on the display is marked as hazardous based on the correlation of the weather radar data and the geographic area.

7. The weather radar system of claim 6, wherein the a shape of the convective cell is generated on the display based on the correlation of the weather radar data and the geographic area.

8. The weather radar system of claim 1, wherein the weather radar system performs queuing in response to detection of the convective cell.

9. The weather radar system of claim 8, wherein the processing electronics utilizes a reflectivity parameter and a spectral width parameter to determine weather events for correlation with the geographic area.

10. The weather radar system of claim 1, further comprising an aircraft lightning sensor coupled to the input.

11. The weather radar system of claim 1, wherein the processing electronics are configured to generate geo-referenced shape descriptors for different weather events based on the weather data, and wherein mapping a presence of lightning data to a geographic area including an error factor comprises generating a geo-referenced, line segment for a lightning event based on sensor position, sensor azimuth, and a possible range for the lightning event.

12. The weather radar system of claim 11, wherein correlating the weather radar data and the geographic area including the error factor comprises determining whether the geo-referenced line segment for the lightning event intersects a geo-referenced shape descriptor for a weather event.

13. The weather radar system of claim 1, wherein convective cells are correlated with lightning tracks to determine a bearing dependent azimuth bias.

14. A method of displaying an indication of a convective cell on an aircraft display in an avionics system, the method comprising:
   receiving lightning sensor data from an aircraft lightning sensor;
   filtering the lightning sensor data with spatial and temporal filters;
   receiving radar returns from an aircraft weather radar system;
   using the filtered data to map a presence of lightning to a geographic area including an error factor;
   determining a position of the convective cell by correlating the weather radar data and the geographic area including the error factor; and
   providing the indication of the convective cell on the aircraft display by correlating the radar returns and the filtered lightning data.

15. The method of claim 14, further comprising using a system of rules to determine which of a plurality of weather events will be correlated with new lightning detection data.

16. The method of claim 14, further comprising mapping the lightning sensor data after the filtering step to determine thunderstorm cores, wherein the thunderstorm cores are identified as areas having the largest number of flashes.

17. The method of claim 14, further comprising determining growing convective cell core locations by correlating new lightning data with the radar returns.

18. The method of claim 14, wherein the indication is a textual symbol or color on a weather radar display.

19. The method of claim 14, wherein the radar returns are at least one of multi-scan radar returns and volumetric scanning radar returns.

20. An apparatus for determining a presence of a hazard for an aircraft, the apparatus comprising:
   means for determining a location of cells from weather radar returns;
   means for determining a presence of lightning;
   means for mapping the presence of lightning to a geographic area including an error factor;
   means for determining a hazard location by correlating the geographic area of the lightning and the location of cells from the weather radar returns; and
   means for displaying the hazard on a display in response to the hazard location in relation to an aircraft flight path.

* * * * *